(12) United States Patent
Saigusa

(10) Patent No.: US 11,372,598 B2
(45) Date of Patent: Jun. 28, 2022

(54) APPLICATION AND INFORMATION PROCESSING APPARATUS

(71) Applicant: CANON KABUSHIKI KAISHA, Tokyo (JP)

(72) Inventor: Hirokazu Saigusa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/006,659

(22) Filed: Aug. 28, 2020

(65) Prior Publication Data

US 2021/0064300 A1    Mar. 4, 2021

(30) Foreign Application Priority Data

Sep. 4, 2019 (JP) .............................. JP2019-161544

(51) Int. Cl.
*G06F 3/12* (2006.01)
*H04N 1/12* (2006.01)

(52) U.S. Cl.
CPC ............ *G06F 3/1205* (2013.01); *G06F 3/129* (2013.01); *G06F 3/1225* (2013.01); *G06F 3/1253* (2013.01); *H04N 1/12* (2013.01)

(58) Field of Classification Search
CPC ...... G06F 3/1205; G06F 3/1225; G06F 3/129; G06F 3/1253; G06F 3/1208; G06F 3/1256; G06F 3/1255; G06F 3/1206; G06F 3/1226; G06F 3/1228; G06F 3/1232; G06F 3/1222; G06F 3/1238; G06F 3/1279; H04N 1/00204; H04N 1/00938; H04N 1/00962; H04N 2201/0094; H04N 1/12

USPC ....................................................... 358/1.13
See application file for complete search history.

(56) References Cited

U.S. PATENT DOCUMENTS

| | | | | |
|---|---|---|---|---|
| 7,965,402 B2* | 6/2011 | Saito | ..................... | G06F 3/1208 358/1.15 |
| 2003/0151589 A1* | 8/2003 | Bensen | ................. | G06F 3/0481 345/156 |
| 2005/0141012 A1* | 6/2005 | Oomura | ................. | G06K 15/00 358/1.14 |
| 2007/0229886 A1* | 10/2007 | Sakurai | .................. | G06Q 10/10 358/1.15 |
| 2009/0207443 A1* | 8/2009 | Kimura | ................. | G06F 3/1204 358/1.15 |
| 2010/0238494 A1 | 9/2010 | Araki | | |
| 2013/0176584 A1* | 7/2013 | Takashima | ............ | G06F 3/1204 358/1.13 |
| 2014/0115608 A1* | 4/2014 | Shirasaka | ............. | G06F 9/4411 719/321 |

FOREIGN PATENT DOCUMENTS

JP          2015-135658 A    7/2015

\* cited by examiner

*Primary Examiner* — Darryl V Dottin
(74) *Attorney, Agent, or Firm* — Canon U.S.A., Inc. IP Division

(57) ABSTRACT

According to an aspect of the disclosure, an information processing apparatus includes: an acquisition unit that acquires an add-in to add a function to a print setting application that provides a print setting window that enables a user to perform print setting used for generating print data in a printer driver; and an addition unit that adds a button instructed by the add-in to a setting window of the application by executing the acquired add-in.

20 Claims, 20 Drawing Sheets

FIG. 4A

```
<?xml version="1.0" encoding="utf-8"?>
<PackageInfo xmlns="http://schemeas.microsoft.com/windows/DeviceMetadata/PackageInfo/2007/11/">
  <MetadataKey>
    <HardwareIDList>   —— 402
      <HardwareID>DOID:MFP1_abcd</HardwareID>   —— 403
      <HardwareID>DOID:MFP2_ijkl</HardwareID>   —— 404
    </HardwareIDList>
  </MetadataKey>
</PackageInfo>
```

FIG. 4B

```
<?xml version="1.0" encoding="utf-8"?>
<SoftwareInfo xmlns="http://schemeas.microsoft.com/windows/DeviceMetadata/SowftwareInfo/2007/11/">
  <DeviceCompanionApplication>   —— 411
    <Package>
      <Identity Name="1234abcd.MFTUtility" Publisher="CN=12345678-abcd-efgh-ijkl-123456189012"/>   —— 412
      <Applications>
      </Applications>
    </Package>
  </DeviceCompanionApplication>
</SoftwareInfo>
```

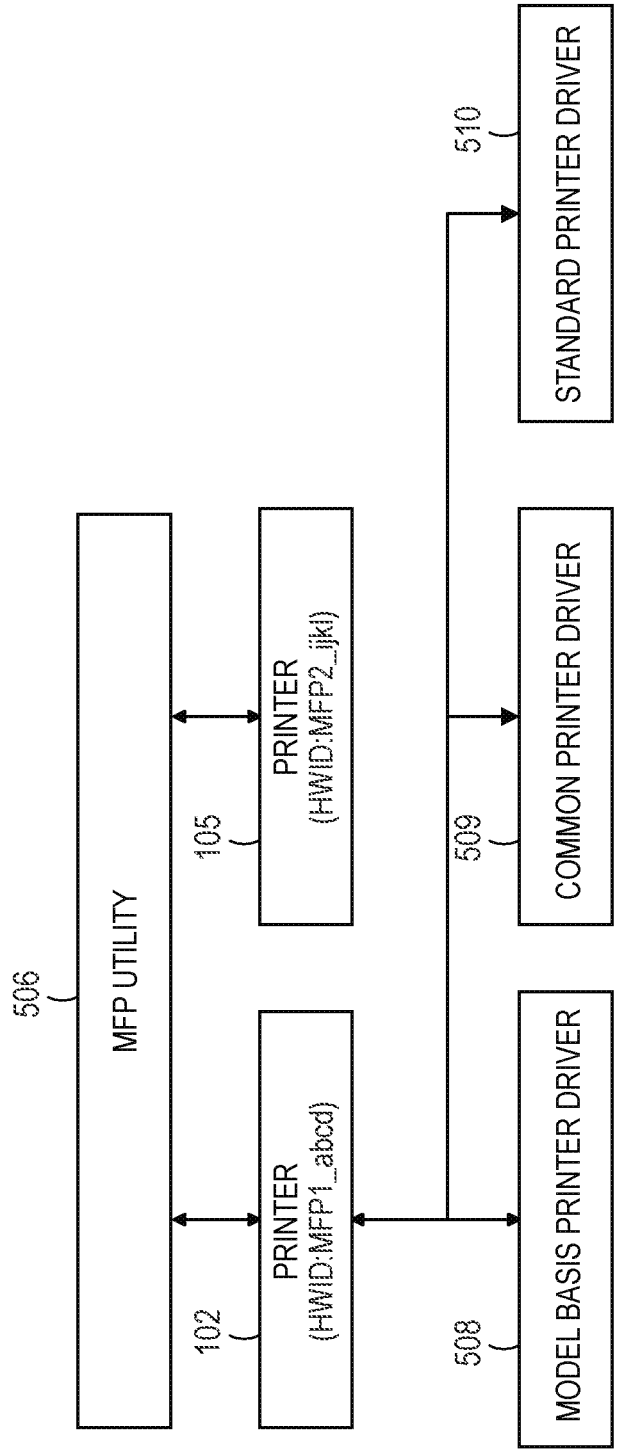

FIG. 11

```
{
    "Add-in1":{
        "shemaName":xxxxx-xxxxx,      — 901
        "familyName":aaaaa-aaaaa,     — 902
        "name":" SCANNER ",
903 — "TileSupported":true,
904 — "PpSupported":false,
905 — "WfSupported":false
906 — "DeviceType":MFP
907 — "Visibility":true
908 — "IconFilePath":bbbbbbbbbb
    },
    "Add-in2":{
        "schemaName":yyyyy-yyyyy,
        "familyName":bbbbb-bbbbb,
        "name":" DETAIL SETTING ",
        "TileSupported":false,
        "PpSupported":true,
        "WfSupported":true
        "DeviceType":All
        "Visibility":true
        "IconFilePath":cccccccccccc
    },
    "Add-in3":{
        "schemaName":zzzzz-zzzzz,
        "familyName":ccccc-ccccc,
        "name":" PREVIEW ",
        "TileSupported":false,
        "PpSupported":false,
        "WfSupported":true
        "DeviceType":All
        "Visibility":true
        "IconFilePath":dddddddddd
    }
    "Add-in4":{
        "schemaName":zzzzz-zzzzz,
        "familyName":ddddd-ddddd,
        "name":" STORAGE ",
        "TileSupported":true,
        "PpSupported":false,
        "WfSupported":false
        "DeviceType":All
        "Visibility":true
        "IconFilePath":eeeeeeeeee
    }
}
```

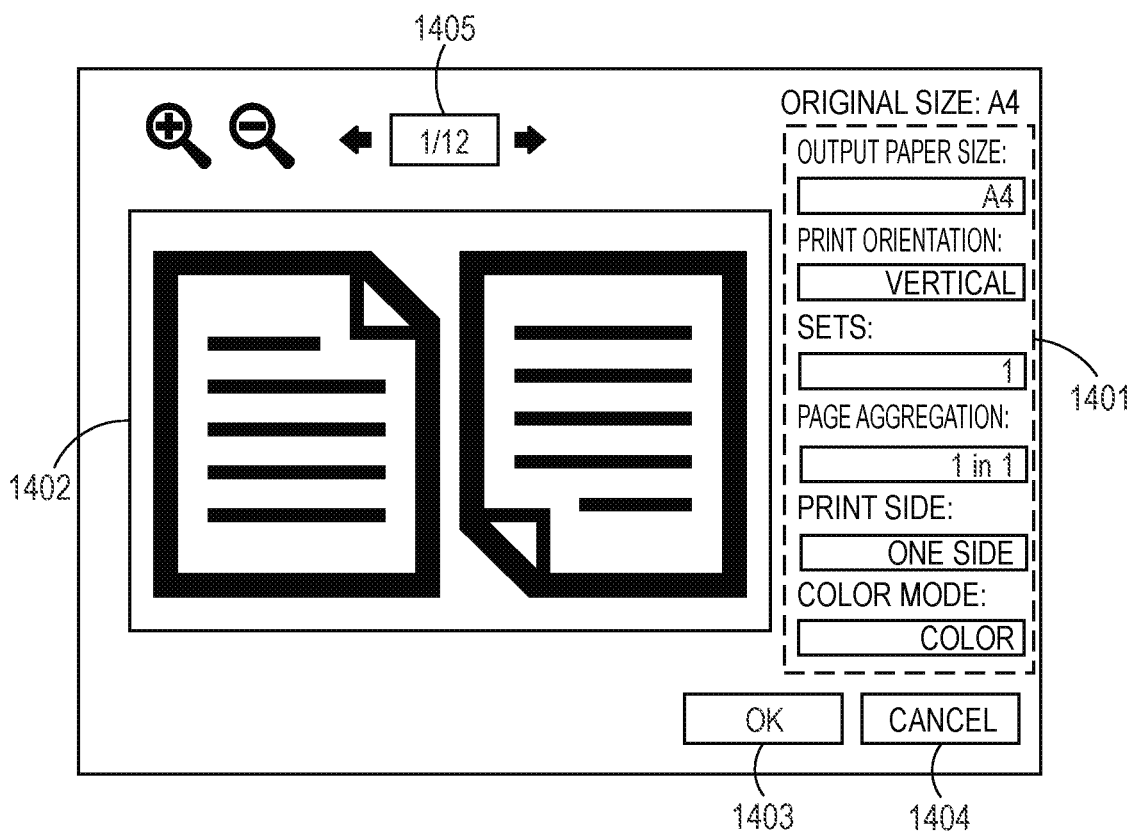

APPLICATION AND INFORMATION PROCESSING APPARATUS

BACKGROUND

Field of the Disclosure

The present disclosure relates to an application and an information processing apparatus extends a function of a printer driver separated from the printer driver and.

Description of the Related Art

A configuration using a printer driver to transmit print data from a host computer to a printer apparatus is known in general. Operating system (OS) that is basic software is installed in a host computer, and a printer driver is configured in accordance with the specification defined by the OS and operates when called from the OS.

The vender that provides a printer apparatus can provide a component that uses the OS to instruct a printer to perform printing by providing a printer driver suitable for the printer apparatus adapted to the specification of the OS.

When Windows® 8 or earlier versions by Microsoft® is used as the OS, the printer driver is configured by an architecture called V3 printer driver. The V3 printer driver can provide a function of displaying user interface (UI) at a timing when a request from a user occurs and urging the user to perform some operation.

Further, in recent years, in Windows 8 or later versions, an architecture called V4 printer driver appears. In the V4 printer driver, since the security property is prioritized, the customizing property of the printer driver is lower than that of the V3 printer driver.

In the V4 printer driver, for example, a configuration module is provided by the OS, and the vender providing the printer apparatus can provide only a setting file or a script file used for customizing the operation of the printer apparatus. To compensate reduction in the customizing property as with the V4 printer driver, the vender providing a printer apparatus can provide a dedicated application used for assisting (extending) the function of a printer driver. Such an application is called Universal Windows Platform (UWP) Device Apps. The UWP Device Apps is an application separated from a printer driver.

In the UWP Device Apps, the vender providing a printer apparatus provides metadata including HardwareID of a printer driver called device stage and ID of the UWP Device Apps on a printer driver basis. Thereby, the printer driver and the UWP Device Apps separated from the printer driver can be associated with each other. Note that a plurality of printer drivers are generally supported by single UWP Device App. The UWP Device App is opened in Microsoft Store® and automatically delivered to the user.

The UWP Device Apps can have a function called Workflow (WF) that executes a process related to printing in response to a predetermined user operation or the like. Further, the UWP Device Apps can have a function called PrintPreference used for setting a print setting unique to a printer.

Further, a printer driver called a universal printer driver as a printer driver used for controlling multiple types of printer apparatuses having different functions is known (Japanese Patent Application Laid-Open No. 2015-135658). In such a type of printer drivers, functions for each individual printer apparatus is included on a model basis in advance, and the optimal UI is displayed in accordance with the model.

SUMMARY

As described above, the UWP Device App is provided to all the users from the Microsoft Store or the like. The present inventors have noticed that such UWP Device App cannot customize the function on a user basis.

The present specification includes embodiments that address the issues described above. The present specification includes a mechanism that customizes the function of an application separated from a printer driver and configured to extend the printer driver on a user basis.

Further features of the present disclosure will become apparent from the following description of exemplary embodiments with reference to the attached drawings.

BRIEF DESCRIPTION OF THE DRAWINGS

FIG. 4A is a diagram illustrating an example of description indicating supported device information in metadata.

FIG. 4B is a diagram illustrating an example of description indicating a print extension application in metadata.

FIG. 5 is a diagram illustrating an example of a printing environment constructed by metadata.

FIG. 11 is a diagram illustrating an example of add-in information described in an add-in information description unit.

FIG. 14A is a diagram illustrating an example of a UI of an add-in application.

FIG. 14B is a diagram illustrating an example of transfer information of an add-in application transferred with a print extension application.

DESCRIPTION OF THE EMBODIMENTS

Embodiments for implementing the present disclosure will be described below with reference to the drawings. Note that the following embodiments are not intended to limit the disclosure according to the claims, and all the combinations of the features described in the embodiments are not necessarily essential for the solution provided by the present disclosure.

First, the configuration of a printing system according to the present disclosure will be described with reference to FIG. 1.

Figure 1:
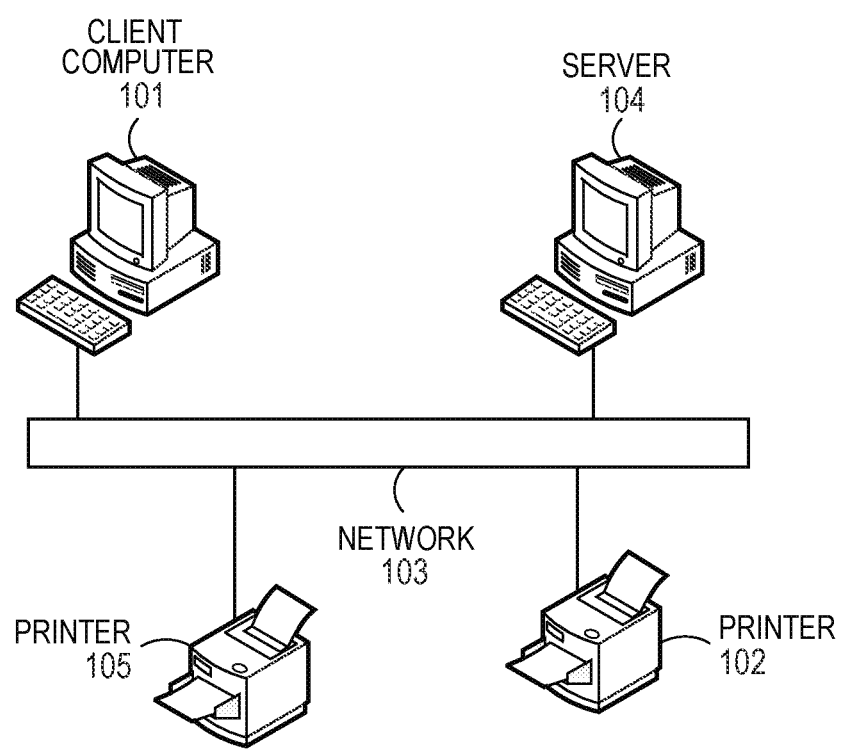
FIG. 1 is a diagram illustrating an example of a configuration of a printing system according to the present embodiment.

FIG. 1 is a diagram illustrating an example of a configuration of the printing system according to one embodiment of the present disclosure.

The printing system of the present embodiment has a client computer 101, a server 104, a printer 102, and another printer 105 that is different from the printer 102. The client computer 101 is an example of the information processing apparatus. The server 104 is to deliver data to the client computer 101 and may be configured to be implemented by using a cloud service or the like. The printers 102 and 105 receive print data in a page description language (PDL) format and performs printing. These apparatuses can communicate with each other via a network 103 including a wide area network (WAN).

Note that the printer 102 and the printer 105 may be a single function printer (SFP) having only a printing function or may be a multi-function printer (MFP) having a printing function, a scanning function, and a copying function. Further, without being limited to two printers, one or three or more printers may be connected to the network 103.

Further, without being limited to one client computer 101, a plurality of client computers 101 may be connected to the network 103. The client computer 101 can transmit print data to the printer 102, the printer 105, or the like.

Figure 2:
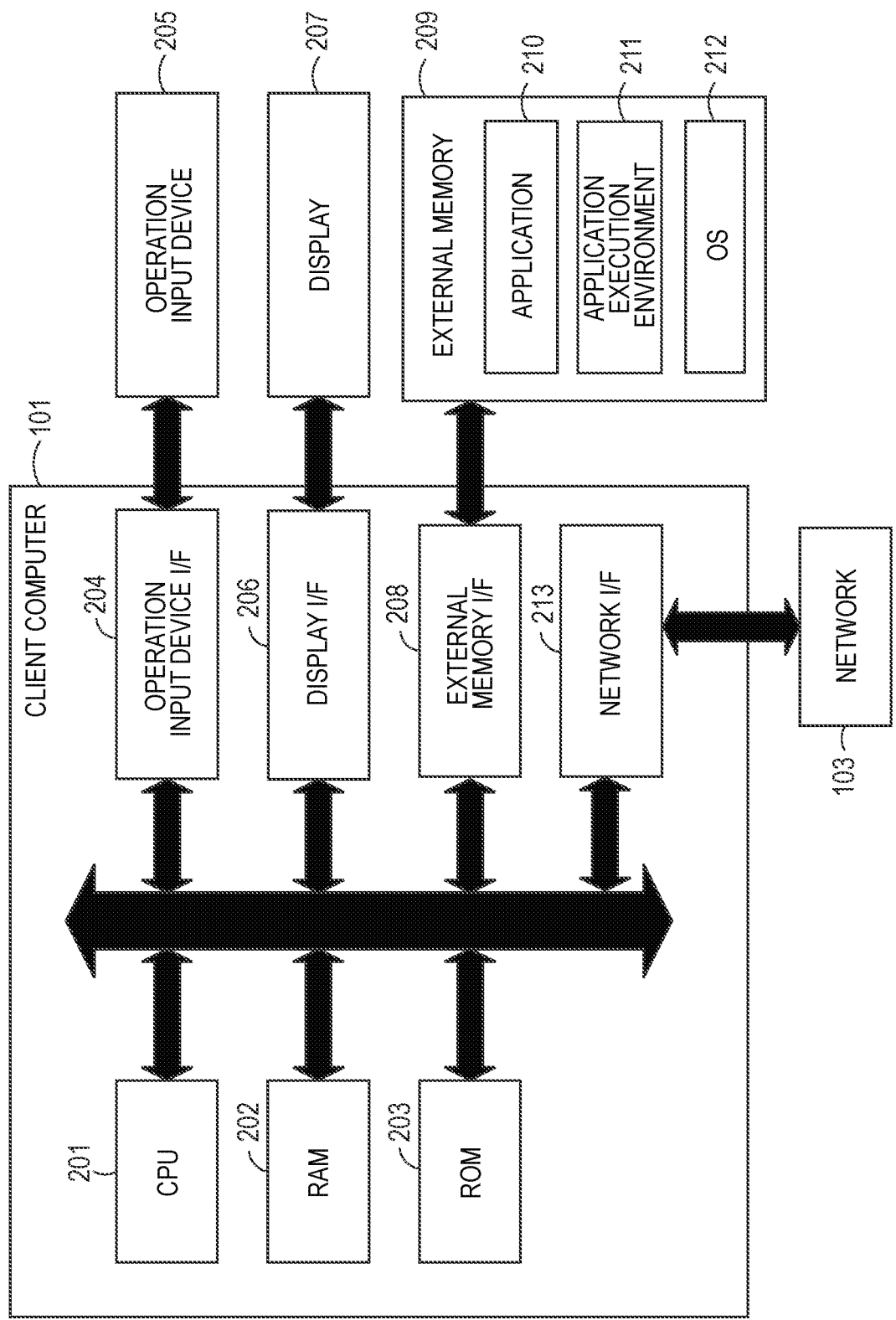
FIG. 2 is a block diagram illustrating an example of a hardware configuration of an information processing apparatus of the present embodiment.

FIG. 2 is a block diagram illustrating an example of a hardware configuration of the client computer 101.

The client computer 101 has a central processing unit (CPU) 201, a random access memory (RAM) 202, an external memory 209, and a read only memory (ROM) 203.

A control unit 200 including the CPU 201 controls the overall operation of the client computer 101. The CPU 201 loads a program stored in the ROM 203 or the external memory 209 to the RAM 202 and executes the program to perform various control such as control of a UI window, generation of print data, transfer of print data, or the like.

The ROM 203 stores a control program or a boot program that can be executed by the CPU 201, various data, or the like. The RAM 202 is the main storage memory of the CPU 201 and is used as a work area or a temporary storage area used for loading various programs.

The external memory 209 is connected to the control unit 200 via an external memory I/F 208. The external memory 209 stores various programs such as an application 210, an application execution environment 211, OS 212, or the like illustrated in detail in FIG. 3 described later, various data (not illustrated), or the like. Although an auxiliary storage device such as a hard disk drive (HDD) is assumed as the external memory 209 in the present embodiment, a nonvolatile memory such as a solid state drive (SSD) or the like may be used instead of or together with the HDD. The hardware components such as the CPU 201, the RAM 202, the ROM 203, the external memory 209, or the like described above form a so-called computer.

An operation input device I/F 204 is an interface that controls an operation input device 205. The operation input device 205 functions as an acceptance unit that accepts an operation from a user. The operation input device 205 is, for example, a keyboard, a pointing device (mouse), a touch input device, or the like.

The display I/F 206 controls display of a window on a display 207. The display 207 functions as a display unit that displays information to the user.

Note that a device such as a touch panel in which the operation input device 205 and the display 207 are integrated may be provided.

The control unit 200 is connected to the network 103 via a network I/F 213. The network I/F 213 transmits print data to a printer on the network 103 and receives an application or a printer driver from a server on the network 103. Note that data communication with an external terminal on the network 103 is wireless communication conforming to the IEEE802.11 series or communication via a mobile communication system such as LTE or 5G or a wired cable such as a LAN cable, for example.

Next, an example of a software configuration of the client computer 101 will be described with reference to FIG. 3.

Figure 3:
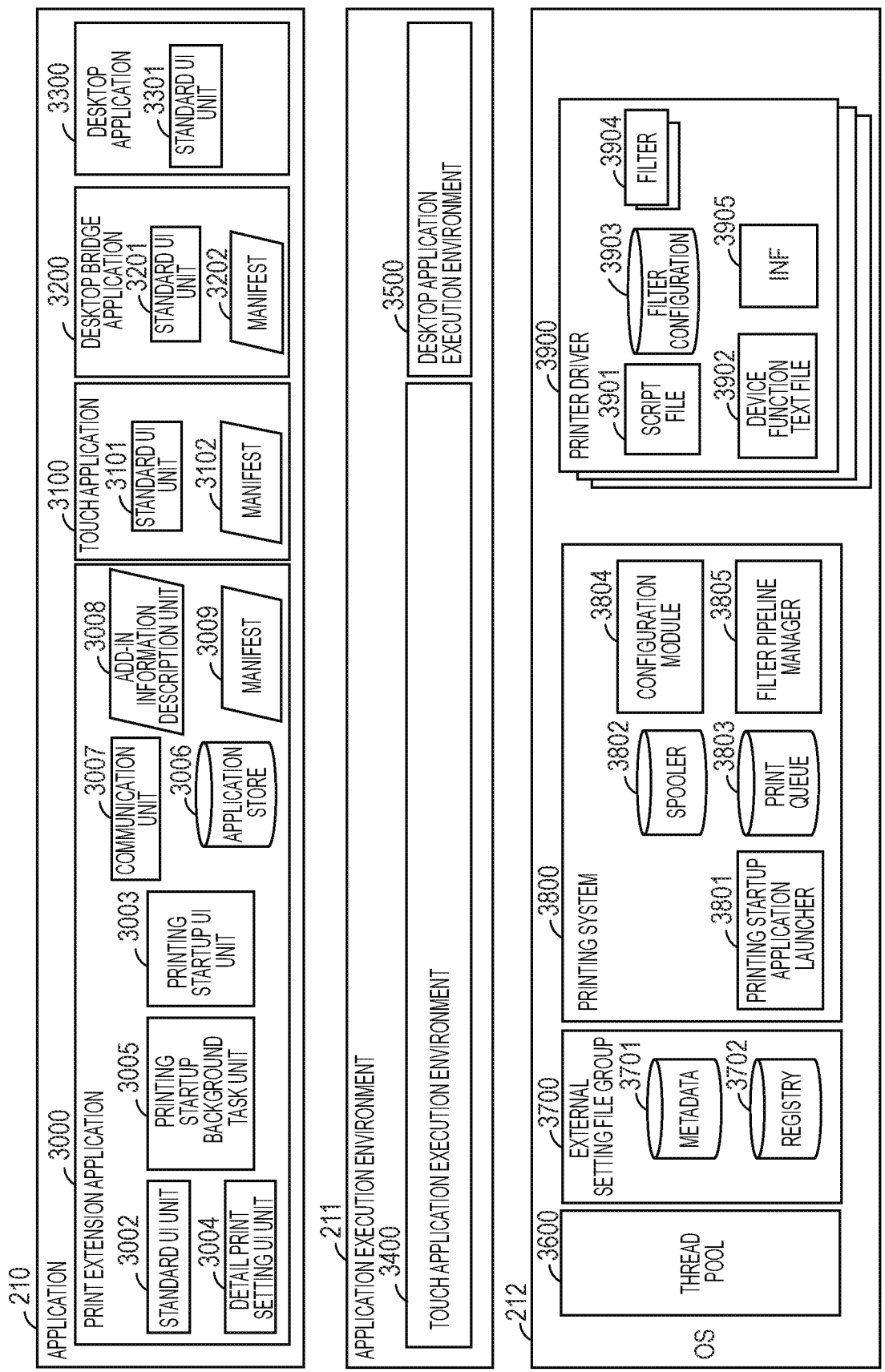
FIG. 3 is a diagram illustrating an example of a software configuration of the information processing apparatus of the present embodiment.

FIG. 3 is a diagram illustrating an example of the software configuration of the client computer 101. As illustrated in FIG. 3, the software in the client computer 101 has three layers of the application 210, the application execution environment 211, and the OS 212. These components are implemented when the CPU 201 loads a program stored in the ROM 203, the external memory 209, or the like to the RAM 202 and executes the program.

First, individual elements forming the OS 212 will be described.

The OS 212 has an external setting file group 3700, a printing system 3800, a printer driver 3900, and a thread pool 3600.

First, the configuration of the external setting file group 3700 will be described.

The external setting file group 3700 includes metadata 3701 and a registry 3702.

The metadata 3701 is definition information having both identifiers of a print extension application identifier of the print extension application 3000 and HardwareID (HWID) of a print queue 3803 of the printer driver 3900 provided by a printer vender. The metadata 3701 has a role of associating (linking) a print extension application identifier with HWID. Note that an example of the metadata 3701 is illustrated in FIG. 4A and FIG. 4B described later.

The registry 3702 is a database of setting information describing a setting group of the OS 212. The registry 3702 can describe a value in the Key And Value scheme. The registry 3702 can describe a setting for each print queue 3803 or the like in addition to basic information on the OS 212 and setting and extension information on the application 210. The registry 3702 registers a setting to switch enabling and disabling of startup of the background task by a printing startup application launcher 3801, an identifier of the print extension application 3000 associated with the printer driver 3900, or the like. Note that the setting registered in the registry 3702 can be changed via a setting window of the OS 212.

Next, components forming the printing system 3800 will be described.

The printing system 3800 includes a print queue 3803, a spooler 3802, a filter pipeline manager 3805, a configuration module 3804, a printing startup application launcher 3801, and the like.

The print queue 3803 is an area in which a generated print job is temporarily stored when a printer present within the network 103 is used to perform printing. A plurality of print queues 3803 may be present. Note that a plurality of print queues 3803 may be present for a single printer 102. In the present embodiment, a print queue corresponding to the printer 102 and a print queue corresponding to the printer 105 have been created, respectively. Although only one print queue is illustrated in the example of FIG. 3, both the print queue corresponding to the printer 102 and the print queue corresponding to the printer 105 are present. The print queue 3803 also has destination information such as an IP address of the corresponding printer or the like.

The spooler 3802 is a module that temporarily stores and manages an XML Paper Specification (XPS) file that is data to be printed after the print process from any of the application 210. The XPS file stored in the spooler 3802 is converted into Page Description Language (PDL) via a filter pipeline manager 3805 and then retransmitted to a printer via the spooler 3802.

The filter pipeline manager 3805 is a module that loads one or more filters 3904 of the printer driver 3900 and converts an XPS file into a PDL file. The filter pipeline manager 3805 is configured as a part of a printing architecture (also referred to as a print system) provided by the OS 212. The filter pipeline manager 3805 loads one or more filters 3904 that are one of the components forming the printer driver 3900 in accordance with definition of the filter configuration 3903 and generates a PDL by using the one or more filters 3904. For example, Printer Command Language (PCL), Portable Document Format (PDF), or the like may be employed as the PDL. Note that details of the filter configuration 3903 and the filters 3904 will be described later.

The configuration module 3804 is a module that generates and changes PrintTicket (also referred to as "print ticket"). Further, the configuration module 3804 has a prohibition function that performs restriction so that print settings that are unable be combined are not performed. Further, the configuration module 3804 also manages PrintCapabilities that is capability information on a printer. Note that a printing startup UI unit 3003, a detail print setting UI unit 3004, and a printing startup background task unit 3005 of the print extension application 3000 described later can call API provided by the configuration module 3804. Each unit of the above can acquire PrintTicket or PrintCapabilities in an Extensible Markup Language (XML) format by calling the API.

The operation of the configuration module 3804 is customized based on a script file 3901 or a device function text file 3902 of the printer driver 3900. The V4 printer driver provides, to the OS 212, the script file 3901 in which a process at printing is described or a device function text file 3902 in which a prohibition rule or a device function is described as the printer driver 3900.

The printing startup application launcher 3801 is a module that controls execution of a background task provided by the printing startup background task unit 3005 or the like. The printing startup application launcher 3801 starts up the printing startup background task unit 3005 when the OS 212 detects input of a print start instruction from the user and performs printing. Note that, when a setting to disable startup of a background task is stored in the registry 3702, the OS 212 suppresses execution of the printing startup background task unit 3005.

Next, the configuration of the printer driver 3900 will be described.

The printer driver 3900 has the script file 3901, the device function text file 3902, the filter configuration 3903, the filter 3904, and an INF 3905. The printer driver 3900 is installed in the OS 212. Note that multiple types of printer drivers 3900 may be present without being limited to a single type thereof.

A process at printing is described in the script file 3901. A prohibition rule or a device function is described in the device function text file 3902. The script file 3901 and the device function text file 3902 are files called by the configuration module 3804. The operation of the configuration module 3804 can be customized by these files.

The filter configuration 3903 is a definition file referenced by the filter pipeline manager 3805, and the order by which one or more filters 3904 are called is described therein.

The filter 3904 is a filter called by the filter pipeline manager 3805 and has a function of converting an input XPS file into PDL and outputting the PDL.

The INF 3905 is a text file in which setting information used for installing the printer driver 3900 is described.

Next, the thread pool 3600 will be described.

The thread pool 3600 is a module that stores a thread used when module groups in various applications 210, the application execution environment 211, or the OS 212 are executed.

Next, individual components forming the application execution environment 211 will be described. The application execution environment 211 includes a desktop application execution environment 3500 and a touch application execution environment 3400.

The touch application execution environment 3400 is an execution environment for executing a touch application 3100 or the print extension application 3000 running on the OS 212 that is a type of the application 210 described later. The touch application execution environment 3400 is an execution environment for operating a Universal Windows Platform (UWP) application distributed from the server 104 and controls the execution of the UWP application.

The desktop application execution environment 3500 is an execution environment for executing a desktop application 3300 that is a type of the application 210 described later. The desktop application execution environment 3500 controls the execution of "Win32/64 application", ".NET application", or the like.

Next, individual components forming the application 210 will be described.

The application 210 includes four types of applications and the like, such as the print extension application 3000, the touch application 3100, a desktop bridge application 3200, and the desktop application 3300.

The desktop application 3300 is conventional "Win32/64 application" or ".NET application", has a standard UI unit 3301, and has a form of an execution file. The desktop application 3300 is an application that operates in the desktop application execution environment 3500.

The touch application 3100 is an application that operates in the touch application execution environment 3400. The touch application 3100 is downloaded via an application distribution system opened on the Internet represented by the Microsoft Store or the like and installed in the client computer 101. In the touch application 3100, required file groups such as a manifest 3102 describing the identifier of the standard UI unit 3101 or the touch application 3100 or the like are packaged and singed, and call for the API in the OS 212 is restricted.

The desktop bridge application 3200 is configured so that a desktop application can be distributed via an application distribution system such as the Microsoft Store or the like opened on the Internet in the same manner as the touch application. The desktop bridge application 3200 can have a configuration in which the desktop application 3300 and the touch application 3100 are multiply combined. In the desktop bridge application 3200, required file groups such as a manifest 3202 describing an identifier used for identifying the standard UI unit 3101 or an application are packaged and singed in the same manner as the touch application 3100.

Note that the desktop bridge application 3200 can operate in either one of or both of the touch application execution environment 3400 and the desktop application execution environment 3500 in accordance with the configuration of the standard UI unit 3201. When the API group of the desktop application execution environment 3500 is used in the standard UI unit 3201, the desktop bridge application 3200 operates on the desktop application execution environment 3500. Further, when the API group of the touch application execution environment 3400 is used in the standard UI unit 3201, the desktop bridge application 3200 operates on the touch application execution environment 3400.

The print extension application 3000 is a type of the touch application 3100 and operates on the touch application execution environment 3400 in the same manner as the touch application 3100. The print extension application 3000 is an application that extends the function of the printer driver 3900 separated from the printer driver 3900 linked to one or a plurality of printer drivers 3900 on the information processing apparatus. The print extension application 3000 is an application called UWP Device Apps. The print extension application 3000 is acquired and installed via the Internet from an application distribution system by the OS 212 in response to installation of the printer driver 3900.

The print extension application 3000 has the standard UI unit 3002, the detail print setting UI unit 3004, the printing startup background task unit 3005, and the printing startup UI unit 3003. Further, the print extension application 3000 has an application store 3006, a communication unit 3007, an add-in information description unit 3008, and the manifest 3009. Note that the print extension application 3000 is not necessarily required to have the detail print setting UI unit 3004, the printing startup background task unit 3005, and the printing startup UI unit 3003.

The standard UI unit 3002 is a UI unit executed in response to receiving a standard UI startup event issued by the OS 212 in response to accepting a user operation to start up the extension application 3000 from a menu provided by the OS 212. The standard UI unit 3002 can freely provide a function as a touch application such as status display of the associated print queue 3803.

The detail print setting UI unit 3004 is a UI unit executed in response to receiving a detail setting event issued by the OS 212. For example, in a state where a print setting window provided by the OS 212 is displayed, the detail setting event is issued when the user provides an instruction for performing a more detailed print setting to be included in a print job generated by the printer driver 3900. The vender providing a printer apparatus can cause a UI customized uniquely at print setting to be displayed by using the detail print setting UI unit 3004. The detail print setting UI unit 3004 generates and displays a UI for print setting based on the PrintTicket of print setting information and PrintCapabilities of print capacity information acquired via the API from the configuration module 3804. The detail print setting UI unit 3004 changes and returns the setting of PrintTicket to the configuration module 3804 as appropriate in accordance with a user operation (detail print setting operation). The detail print setting UI unit 3004 is a UI unit corresponding to a function called PrintPreference used for setting a print setting unique to a printer.

The printing startup background task unit 3005 is a component corresponding to a background task to be executed when a print event is issued. The task provided by the printing startup background task unit 3005 has a limited terminal time and is forced to be terminated by the OS 212 when a certain period has elapsed. Further, the printing startup background task unit 3005 operates as a different thread from the UI thread.

The printing startup background task unit 3005 can acquire, read, or write the PrintTicket via the API of the configuration module 3804. The background task determines whether or not to start up the printing startup UI unit 3003 and, if necessary, requests the OS 212 to start up the printing startup UI unit 3003 that is a component of a foreground task. Note that transfer of information between the background task and the printing startup UI unit 3003 can be performed by reading and writing information from and to the application store 3006.

Note that, when determining not to start up the printing startup UI unit 3003, the printing startup application launcher 3801 does not start up the print extension application 3000.

Furthermore, the printing startup UI unit 3003 started up by the printing startup background task unit 3005 can compile and return the XPS or PrintTicket, which is data to be printed, to the OS 212.

Once a startup request of the printing startup UI unit 3003 is issued from the printing startup background task unit 3005 to the OS 212, the OS 212 starts up the printing startup UI unit 3003. The printing startup UI unit 3003 can acquire an XPS file of data to be printed in addition to be able to acquire PrintTicket or PrintCapabilities and change the setting. When changing the XPS file, it is required to once pass a complied XPS file to the printing startup background task unit 3005 via the application store 3006 and return the XPS file compiled by the printing startup background task unit 3005 to the OS 212. The printing startup UI unit 3003 displays the UI used for confirmation on printing, the UI used for allowing the user to input a blank setting, or the like in the present embodiment but may display UI for another process as long as it is a process for displaying a UI at printing. The printing startup UI unit 3003 is a UI unit corresponding to a function called Workflow (WF) that causes a process related to printing to be performed in response to a predetermined user operation or the like.

The manifest 3009 is a file describing a setting value of the print extension application 3000. A print extension application identifier that uniquely indicates the print extension application 3000, function information, or the like are described.

The communication unit 3007 is a module responsible for communication, for example, when information is acquired from a printer.

The add-in information description unit 3008 describes information such as an identifier of an add-in application that can extend the print extension application 3000 later. The add-in application is configured in a form of either the touch application 3100 or the desktop bridge application 3200 and provides an additional function for the print extension application 3000. The add-in application can be installed from the Microsoft Store, for example. Further, a plurality of add-in applications may be installed.

FIG. 4A and FIG. 4B are diagrams illustrating an example of description of the metadata 3701 that associates the printer 102 that is a device with the print extension application 3000.

FIG. 4A corresponds to an example of the description indicating supported device information in the metadata 3701.

As illustrated in FIG. 4A, the metadata 3701 describes a HardwareIDList tag 402 indicating a list of printers 102 using this metadata. An item 403 indicates that the printer 102 having HardwareID of "MFP1_abcd" uses the metadata 3701. Similarly, an item 404 indicates that the printer 105 having HardwareID of "MFP2_ijkl" uses this metadata. In such a way, a plurality of printers using the metadata may be listed in one metadata 3701.

Although a case where HardwareIDs of two printers are designated in the metadata 3701 is illustrated as an example in the present embodiment, the embodiment is not limited thereto. The number of HardwareIDs of the printer 102 described in the metadata 3701 may be one or may be three or greater. Note that the HardwareID is identification information returned from a printer to uniquely identify the printer.

FIG. 4B corresponds to an example of description indicating the print extension application 3000 in the metadata 3701.

As illustrated in FIG. 4B, the metadata 3701 describes a DeviceCompanionApplications tag 411 indicating a list of the print extension application 3000 using this metadata. An item 412 indicates that the print extension application 3000 of "1234abcd.MFPUtility" provided by a printer vender of "12345678-abcd-efgh-ijkl-123456789012" uses this metadata. That is, the metadata 3701 including the description of FIG. 4A and FIG. 4B indicates that the print extension application 3000 (1234abcd.MFPUtility) is associated with the printer 102 (MFP1_abcd) and the printer 105 (MFP2_ijkl).

The printer vender provides such the metadata 3701 in advance to a server used for metadata managed by Microsoft or the like. This enables the printer vender to perform control to automatically install the optimal print extension application 3000 to a connected device when the printer driver 3900 is installed in the user environment. A case where the printer 102 is connected to the client computer 101 will be described below as an example.

Once the printer 102 is connected to the client computer 101, the OS 212 searches for the metadata 3701 registered in a predetermined server (for example, a server used for metadata managed by Microsoft). In response to finding the metadata 3701 in which the HardwareID returned from the above connected printer 102 is described in the HardwareIDList tag 402 by the search, the OS 212 stores the found metadata 3701 in the external memory 209 of the client computer 101. Furthermore, the OS 212 acquires, from an application distribution system (not illustrated), the print extension application 3000 described in the DeviceCompanionApplication tag 401 of the stored metadata 3701. The OS 212 then installs the acquired print extension application 3000 in the external memory 209 of the client computer 101 and associates the installed print extension application 3000 with the printer 102. Thereby, when a print request occurs via the printer driver 3900 to the printer 102, the corresponding print extension application 3000 can be started up. Such the metadata 3701 is provide by a printer vender. The printer vender provides such the metadata 3701 in advance to a server used for metadata managed by Microsoft or the like. Accordingly, when the printer driver 3900 is installed in the user environment, the printer vender can perform control to automatically install the print extension application 3000 that is optimal to the connected device.

FIG. 5 is a diagram illustrating an example of a print environment constructed by the metadata 3701.

The printer 102 has HardwareID of "MFP1_abcd". Once the printer 102 is connected to the client computer 101, the OS 212 acquires, from the server used for metadata, the metadata 3701 in which HardwareID of "MFP1_abcd" is described in the HardwareIDList tag. Furthermore, the OS 212 acquires, from the application distribution system, the print extension application 3000 of MFPUtility 506 described in the acquired metadata 3701 and associates the acquired print extension application 3000 with the printer 102.

Note that there may be a plurality of printer drivers 3900 described in the HardwareIDList 402 of the metadata 3701 and installed in the client computer 101 for the printer 102. That is, a plurality of printer drivers may present as a printer driver corresponding to the printer 102 that is a single device. In this example, description will be provided as three drivers of a model basis printer driver 508, a common printer driver 509, and a standard printer driver 510 being installed.

The model basis printer driver 508 is a dedicated printer driver for the printer 102 provided by a printer vender. The common printer driver 509 is a common printer driver that is provided by a printer vender and is able to process multiple types of printers 102 of the printer vender. Further, the standard printer driver 510 is a printer driver provided as one of the functions within a package of the OS 212 along with the OS 212. The standard printer driver 510 is a class driver that is available commonly to printer apparatuses provided by a plurality of venders. The standard printer driver 510 is a printer driver that can process a wide variety of printers by using a standardized printing method.

As described above, there are a plurality of printer drivers available for a printer, and a printer driver to be used differs in accordance with a connection state of the Internet, the type of the OS 212, a use environment, or the like. Typically, the OS 212 references version information on the printer driver or the like and automatically selects and installs the latest printer driver having the highest functionality out of available printer drivers. Note that the printer driver includes information called HardwareID or CompatibleID used for identifying an apparatus. Once a printer is connected to the client computer 101, the OS 212 acquires the above ID information from the printer and searches for and installs a printer driver having the corresponding ID. Note that, although association with respect to the printer 102 is described in this example, other printers including the printer 105 may also be associated with the print extension application 3000 in the same method.

As described above, by providing the metadata 3701, a printer vender providing a printer can control which print extension application 3000 is to be provided to respective printers. For example, a printer vender may provide a single print extension application 3000 commonly to a plurality of printers or may provide different print extension applications 3000, respectively. However, it is not possible to classify and provide the print extension application 3000 in accordance with the type of printer drivers associated with a single printer. In FIG. 5, there are three types of printer drivers 508 to 510 used in the printer 102, the number of types of the print extension application 3000 that can be linked with each driver is always one.

Herein, add-in information described (held) in the add-in information description unit 3008 will be described with reference to FIG. 11.

FIG. 11 is a diagram illustrating an example of the add-in information described in the add-in information description unit 3008.

The add-in information is information by which the print extension application 3000 starts up an add-in application. The add-in information describes information on individual add-in in a JSON form and is described in the add-in information description unit 3008. Note that, although JSON is used as a data format of add-in information in the present embodiment, XML or other formats may be used.

In FIG. 11, a schemer name 901 is a name space of such an add-in application.

A family name 902 has a role as an identifier that identifies the add-in application.

TileSupported 903 indicates whether or not the add-in application supports the standard UI unit 3002 of the print extension application 3000. If the TileSupported 903 is "true", this indicates that the add-in application supports the standard UI unit 3002, and if the TileSupported 903 is "false", this indicates that the add-in application does not support the standard UI unit 3002.

PpSupported 904 indicates whether or not the add-in application supports the detail print setting UI unit 3004 of the print extension application 3000. If the PpSupported 904 is "true", this indicates that the add-in application supports the detail print setting UI unit 3004, and if the PpSupported 904 is "false", this indicates that the add-in application does not support the detail print setting UI unit 3004.

WfSupported 905 indicates whether or not the add-in application supports the printing startup UI unit 3003 of the print extension application 3000. If the WfSupported 905 is "true", this indicates that the add-in application supports the printing startup UI unit 3003, and if the WfSupported 905 is "false", this indicates that the add-in application does not support the printing startup UI unit 3003.

A device type 906 represents a type (printer model) of the printer 102 supported by the add-in application. In this example, it is indicated that the add-in application supports "MFP" (that is, a printer of the multi-function type) (that is, does not support a printer type other than the multi-function type). Note that, if the device type 906 is "ALL", this indicates that the add-in application supports all the types of printers.

Visibility 907 is a value indicating whether or not the print extension application 3000 displays a UI used for starting up the add-in application (startup button). If the Visibility 907 is "true", this indicates that the UI used for starting up the add-in application is displayed, and if the Visibility 907 is "false", this indicates that such a UI is not displayed.

An icon file path 908 indicates a file path of an icon used when a UI used for starting up the add-in application (startup button) is displayed.

The add-in information as illustrated above is described in the add-in information description unit 3008.

An update method of add-in information described in the add-in information description unit 3008 will now be described.

The user accesses from the client computer 101 to the Microsoft Store, for example, and selects add-in in the Microsoft Store. Thereby, the add-in is installed in the client computer 101 from the Microsoft Store.

The installed add-in is started up by the following method (1) or (2), for example. (1) After the completion of the install of the add-in, the add-in is started up in response to the user voluntarily selecting the add-in.

(2) After the completion of the install of the add-in, a toast notification to the effect that the install is completed is provided by the function of the OS 212 (a toast notification corresponds to a notification by means of a button displayed on the right end of a Windows screen). Another configuration may be possible in which, once this toast notification is selected by the user, the add-in is started up in response to the selection. In such a case, setting information to the effect that a toast notification for starting up its own application is performed will be included in the add-in after the completion of installation, and the OS 212 will read the setting information to perform the toast notification.

According to the method of (1) or (2) described above, the add-in is started up, and in response to the startup, the add-in starts up the print extension application 3000. When the application is started up, the application startup API defined by Windows is called. The add-in designates the ID and Value set of the application intended to start up (that is, "print extension application 3000" in this example) as arguments for the API. A value corresponding to each add-in information as illustrated in FIG. 11 is included in each value of the Value set. That is, a section interposed between "{" and "}" in FIG. 11 is included in the Value set. Furthermore, in addition to these values, a value of an encrypted "name" (that is, "add-in name") is also included in the Value set.

The print extension application 3000 is started up and receives the Value set described above. The print extension application 3000 decodes the encrypted name included in the Value set, compares the decoded name with the originally included name in a plain text, and if these names have the same value, determines that the add-in is reliable. The print extension application 3000 then stores (a value except an encrypted name of) a value of the Value set in a management region (the add-in information description unit 3008) of the print extension application 3000. Accordingly, when the add-in is newly installed, add-in information on the installed add-in is stored in the add-in information description unit 3008.

According to the above process, the state where the add-in information as illustrated in FIG. 11 is registered in the add-in information description unit 3008 is realized. Once the above state is realized, the print extension application 3000 and the add-in may automatically cancel its own startup state and terminate the process, or may provide display such as "Process ended. Please close application (or add-in)." to request the user to close the print extension application 3000 and the add-in.

Note that, as described above, startup of the print extension application 3000 and a process such as passing ID and Value set to the print extension application 3000 as arguments may be performed every time the add-in is started up. Further, after the print extension application 3000 is once started up, startup of the print extension application 3000 and a process such as passing ID and Value set to the print extension application 3000 as arguments may not be performed even when the add-in is started up. Further, while the print extension application 3000 is started up every time in accordance with startup of the add-in, the print extension application 3000 side may not perform the subsequent process. That is, on the print extension application 3000 side, when it is confirmed that the same Value set is already registered, the registration process of the value of the Value set to the add-in information description unit 3008 is not performed. Furthermore, the print extension application 3000 may be automatically terminated even without displaying the UI displaying "Process ended. Please close application." or the like as described above.

Next, the standard UI unit 3002 of the print extension application 3000 will be described.

FIG. 6A to FIG. 6E are diagrams illustrating the standard UI of the print extension application 3000. Note that the window transition of the UI illustrated in FIG. 6A to FIG. 6E is realized by loading, to the RAM 202, and executing a program by which the CPU 201 implements each module, each component, or each application stored in the external memory 209.

Figure 6A:
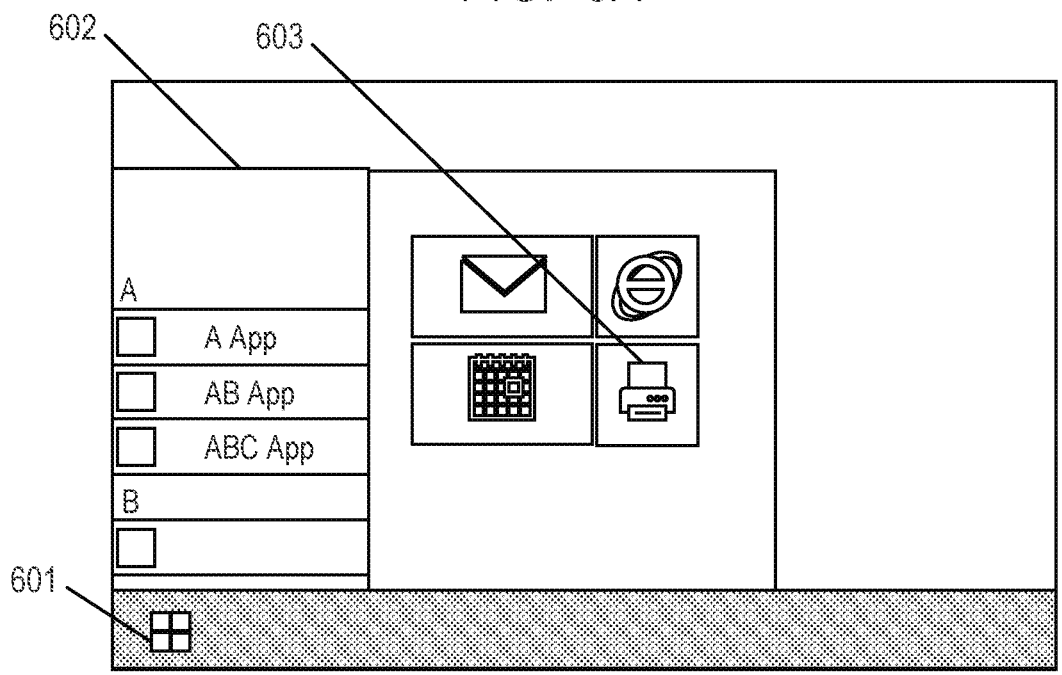
FIG. 6A is a diagram illustrating an example of UI of OS.

FIG. 6A is a diagram illustrating an example of the UI of the OS 212.

When a start menu button 601 is pressed by a user operation, an application menu 602 is displayed by the OS 212.

In the application menu 602, the print extension application 3000, the touch application 3100, the desktop application 3300, and the desktop bridge application 3200 that have been installed in the OS 212 are arranged. Herein, an icon 603 is an icon of the print extension application 3000. By pressing the icon 603, the user is able to cause the OS 212 to issue a standard UI startup event and start up the standard UI unit 3002 of the print extension application 3000.

Figure 6B:
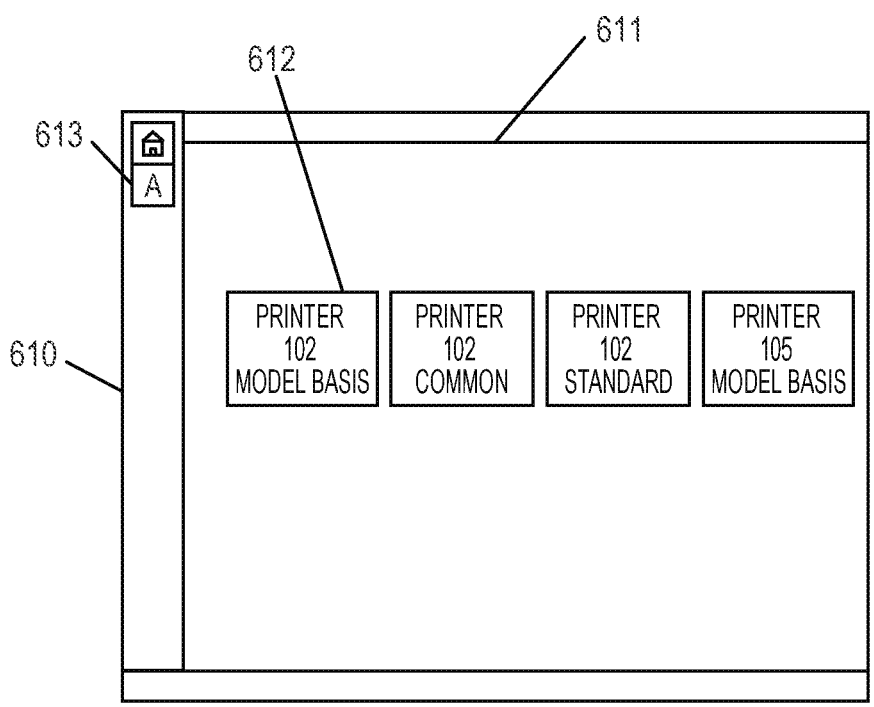
FIG. 6B is a diagram illustrating an example of a device menu window of a standard UI of a print extension application.

FIG. 6B is a diagram illustrating an example of a device menu window of the standard UI unit 3002.

As illustrated in FIG. 6B, the device menu window is formed of a menu 610 and a main view 611.

A list of functions of the print extension application 3000 is displayed in the menu 610, and when any of the displayed buttons (for example, an add-in menu button 613) is pressed, a corresponding page is displayed in the main view 611.

Figure 6C:
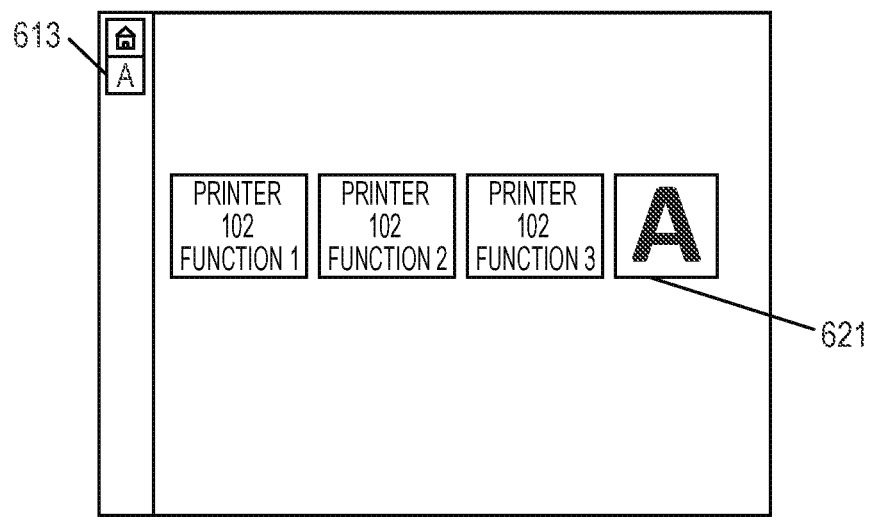
FIG. 6C is a diagram illustrating an example of a device page of the standard UI of the print extension application.
Figure 6D:
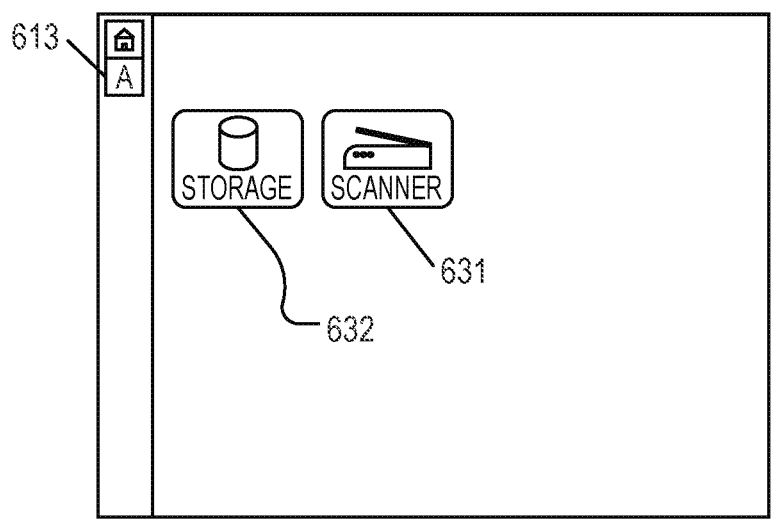
FIG. 6D is a diagram illustrating an example of an add-in window.
Figure 6E:
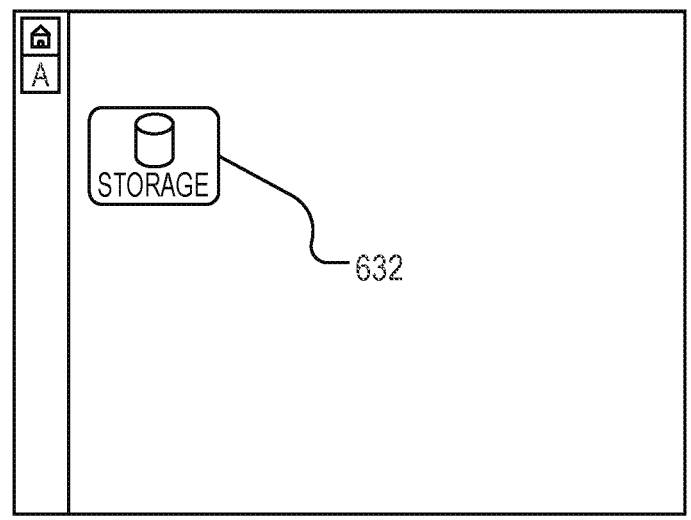
FIG. 6E is another diagram illustrating an example of an add-in window.

The add-in menu button 613 is a button used for displaying an add-in application window (the window as illustrated in FIG. 6E) that can be used commonly to all the printers. In response to the add-in menu button 613 being pressed, the process illustrated in FIG. 12A to FIG. 12C described later is performed, and an add-in application window as illustrated in FIG. 6E is displayed. The display of the add-in application window will be described later.

In the device menu window (FIG. 6B), a list of icons corresponding to the print queues 3803 is displayed in the main view 611.

For example, an icon 612 is an icon of the print queue 3803 corresponding to the printer 102. When the icon 612 is pressed, a device page corresponding to the print queue of the model basis printer driver of the printer 102 is displayed as illustrated in FIG. 6C.

Figure 12A:
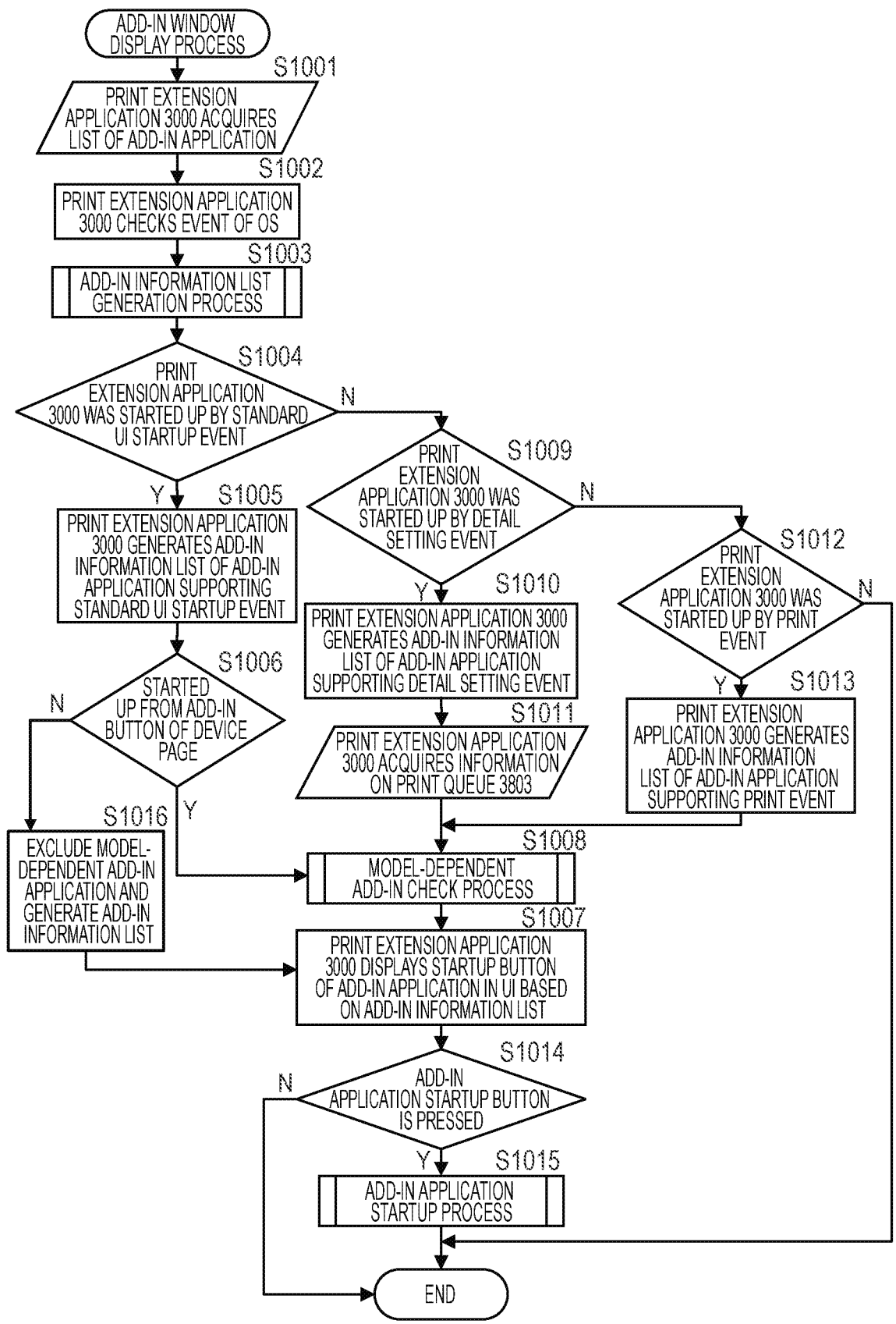
FIG. 12A is a flowchart illustrating an example of an add-in window display process.
Figure 12B:
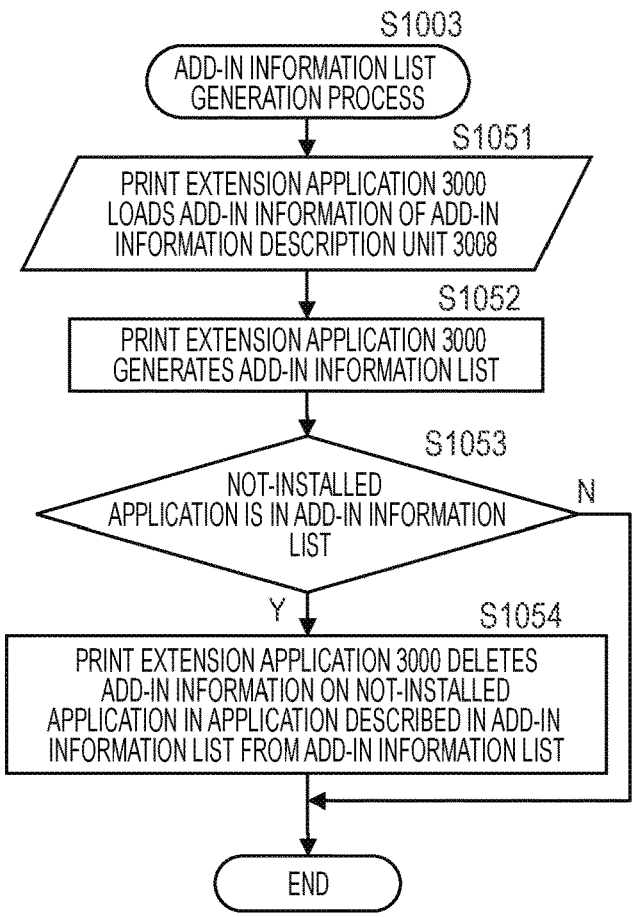
FIG. 12B is a flowchart illustrating an example of an add-in information list generation process.
Figure 12C:
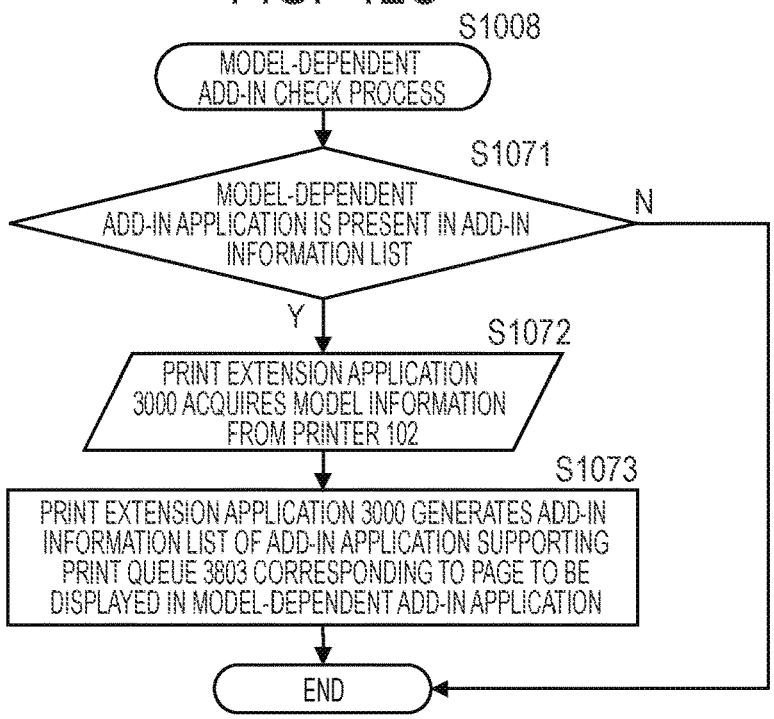
FIG. 12C is a flowchart illustrating an example of a model-dependent add-in application confirmation process.

FIG. 6C is a diagram illustrating an example of a device page of the standard UI unit 3002. In the device page, a list of functions in accordance with print queues is arranged. In the example of FIG. 6C, a list of functions (respective buttons corresponding to functions 1 to 3 of the printer 102) and an add-in button 621 are displayed in the device page. Herein, in response to the add-in button 621 being pressed, the add-in window display process as illustrated in FIG. 12A to FIG. 12C described later is performed, and an add-in window corresponding to the print queue of the model basis printer driver of the printer 102 is displayed as illustrated in FIG. 6D. At this time, the print extension application 3000 passes the fact that the add-in button 621 is pressed to the add-in window display process to be started up (FIG. 12A) or stores the fact in a storage area that can be confirmed from the add-in window display process. This information is used in determination in S1006 of FIG. 12A described later.

FIG. 6D is a diagram illustrating an example of the add-in window displayed when the add-in button 621 is pressed. In the present add-in window, a list of add-in application startup buttons is displayed for add-in applications for which the print extension application 3000 supports the standard UI unit 3002 and which can be used by the print queue of the model basis printer driver of the printer 102.

A button 631 is an add-in application startup button that starts up a scanner add-in application and, when pressed, can cause the corresponding scanner add-in application to start up.

A button 632 is a storage add-in application startup button and, when pressed, can cause the corresponding storage add-in application to start up.

FIG. 6E is a diagram illustrating an example of the add-in window displayed when the add-in menu button 613 is pressed.

The add-in window illustrated in FIG. 6E is different from the add-in window illustrated in FIG. 6D. In the add-in window illustrated in FIG. 6E, a list of add-in in application startup buttons for which the print extension application 3000 supports the standard UI unit 3002 and which does not depend on a printer model is displayed. The add-in application which does not depend on a printer model refers to the add-in application where the device type 906 of FIG. 11 is "ALL". Thus, in the add-in window illustrated in FIG. 6E, unlike the add-in window illustrated in FIG. 6D, the startup button 631 is not displayed. Note that a process of determining which add-in application startup button to be displayed in an add-in window will be described later with reference to FIG. 12A to FIG. 12C.

Note that, as another embodiment, the following add-in application startup button may be displayed in the add-in window displayed when the add-in menu button 613 is pressed. For example, a list of add-in application startup buttons of the add-in application for which the print extension application 3000 supports the standard UI unit 3002 and which can be used by all the associated print queues 3803 may be displayed in the add-in window. In the case of such a configuration, when the printer corresponding to all the associated print queues is "MFP", for example, a list of add-in application startup buttons of the add-in application in which the device type 906 of FIG. 11 is "ALL" or "MFP" is displayed.

Further, as another embodiment, a list of add-in application startup buttons of all the add-in applications for which the print extension application 3000 supports the standard UI unit 3002 may be displayed in the add-in window displayed when the add-in menu button 613 is pressed.

Next, a basic flow of printing will be described with reference to FIG. 7A, FIG. 7B, and FIG. 8A to FIG. 8C.

Figure 7A:
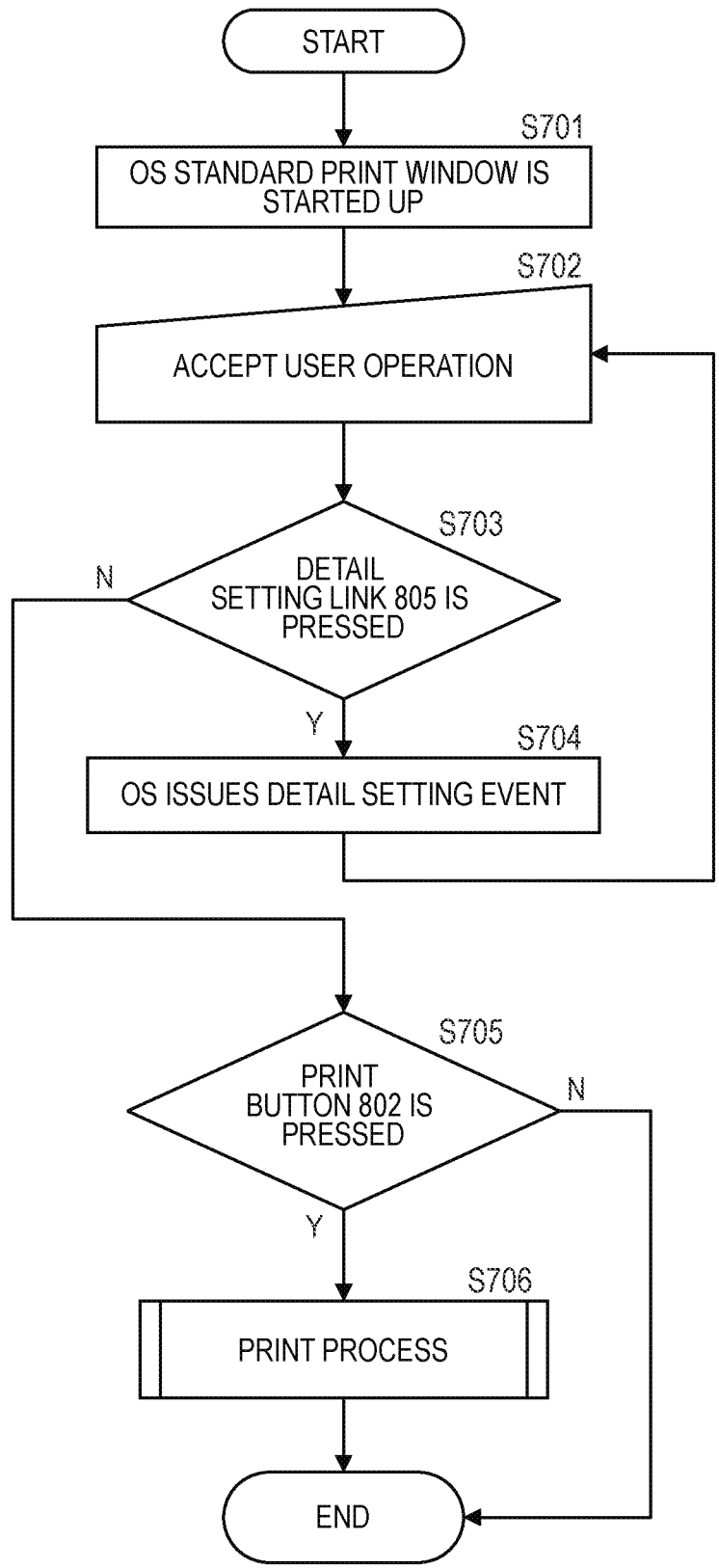
FIG. 7A is a flowchart illustrating an example of a basic flow of printing in the information processing apparatus of the present embodiment.
Figure 7B:
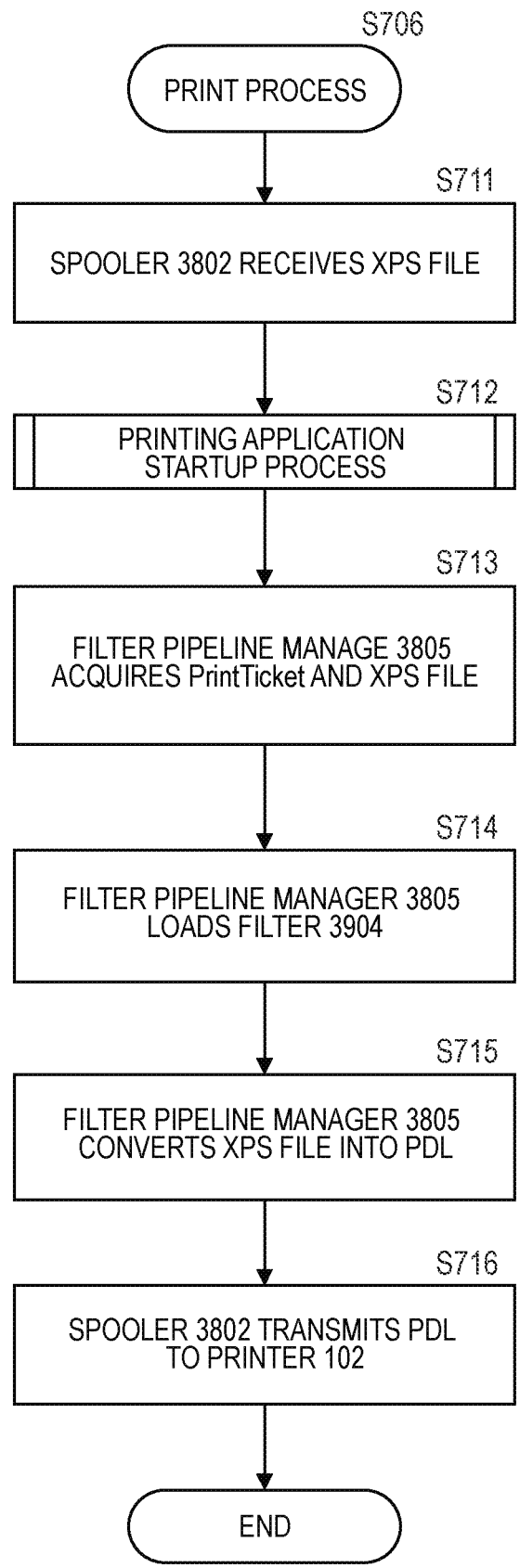
FIG. 7B is a flowchart illustrating an example of a basic flow of printing in the information processing apparatus of the present embodiment.

FIG. 7A is a flowchart illustrating an example of a basic flow of printing in the information processing apparatus of the present embodiment. Note that the processes of the flowcharts of FIG. 7A and FIG. 7B are realized by loading, to the RAM 202, and executing a program by which the CPU 201 implements each module, each component, or each application stored in the external memory 209.

Figure 8A:
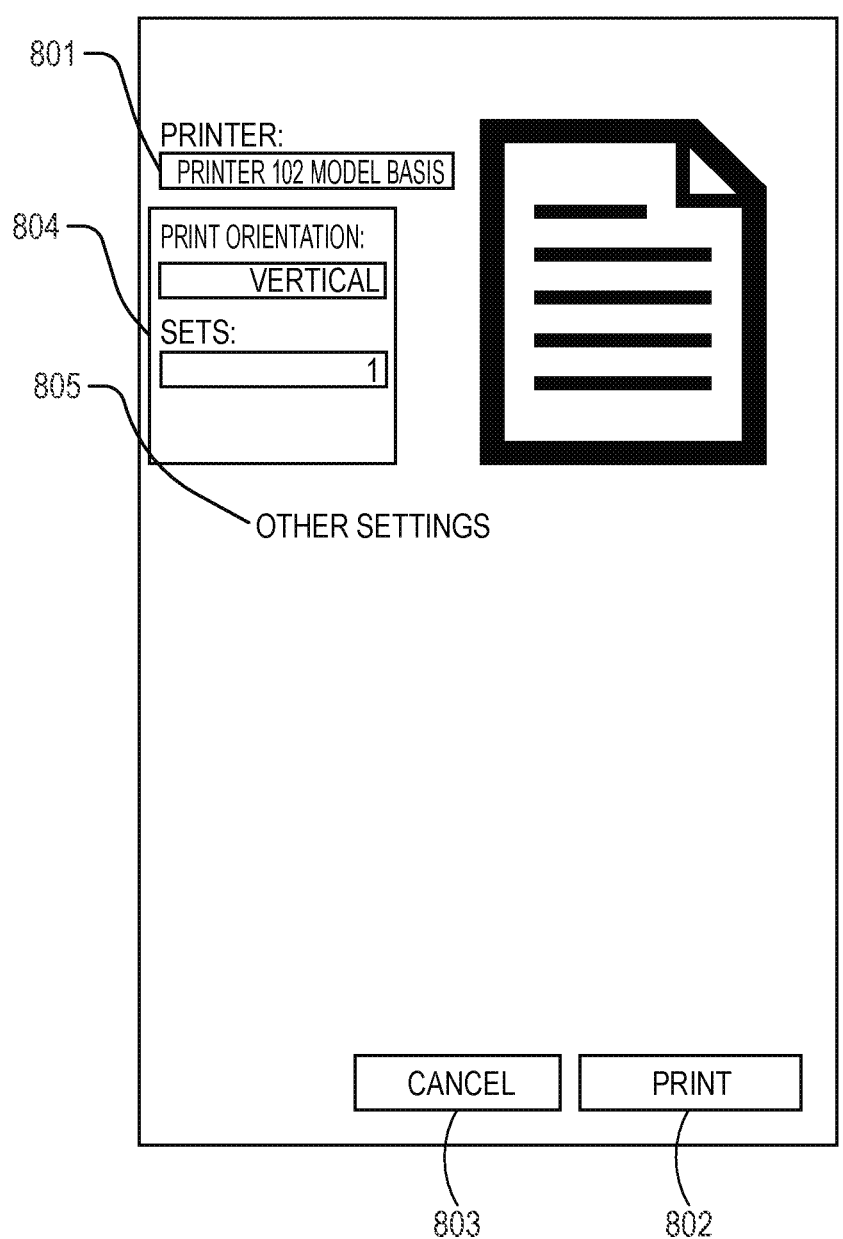
FIG. 8A is a diagram illustrating a detail print setting UI of a print extension application.
Figure 8B:
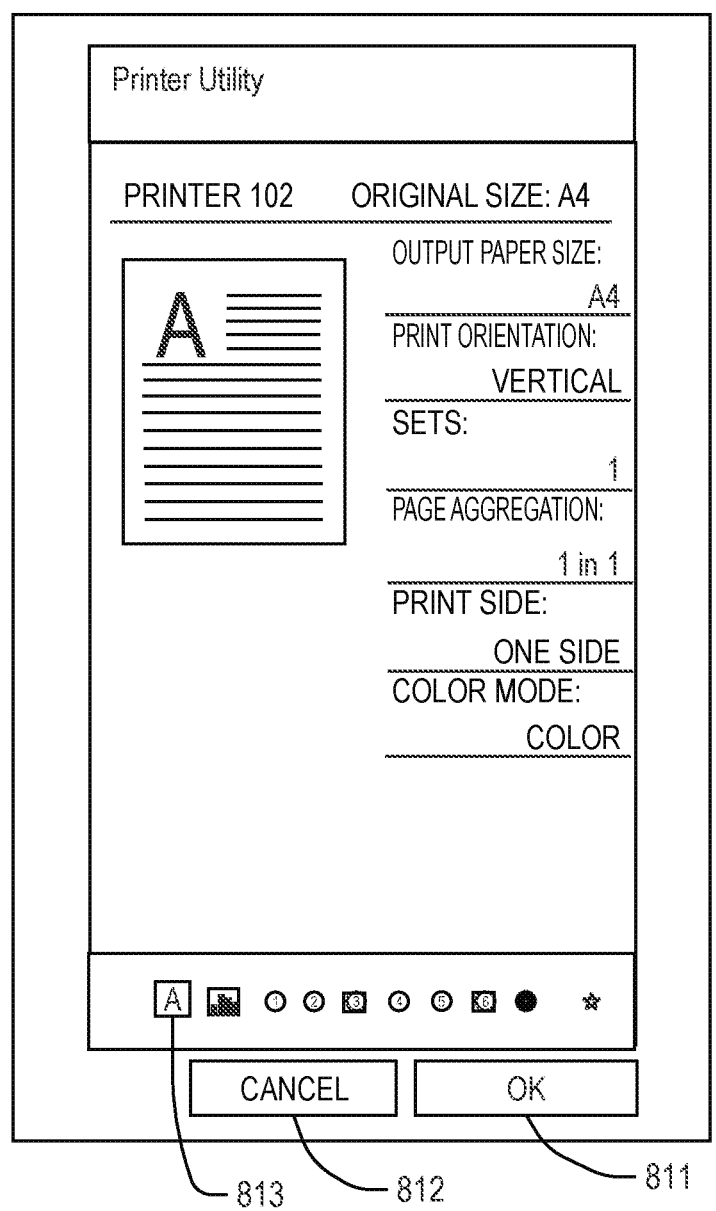
FIG. 8B is a diagram illustrating a detail print setting UI of a print extension application.
Figure 8C:
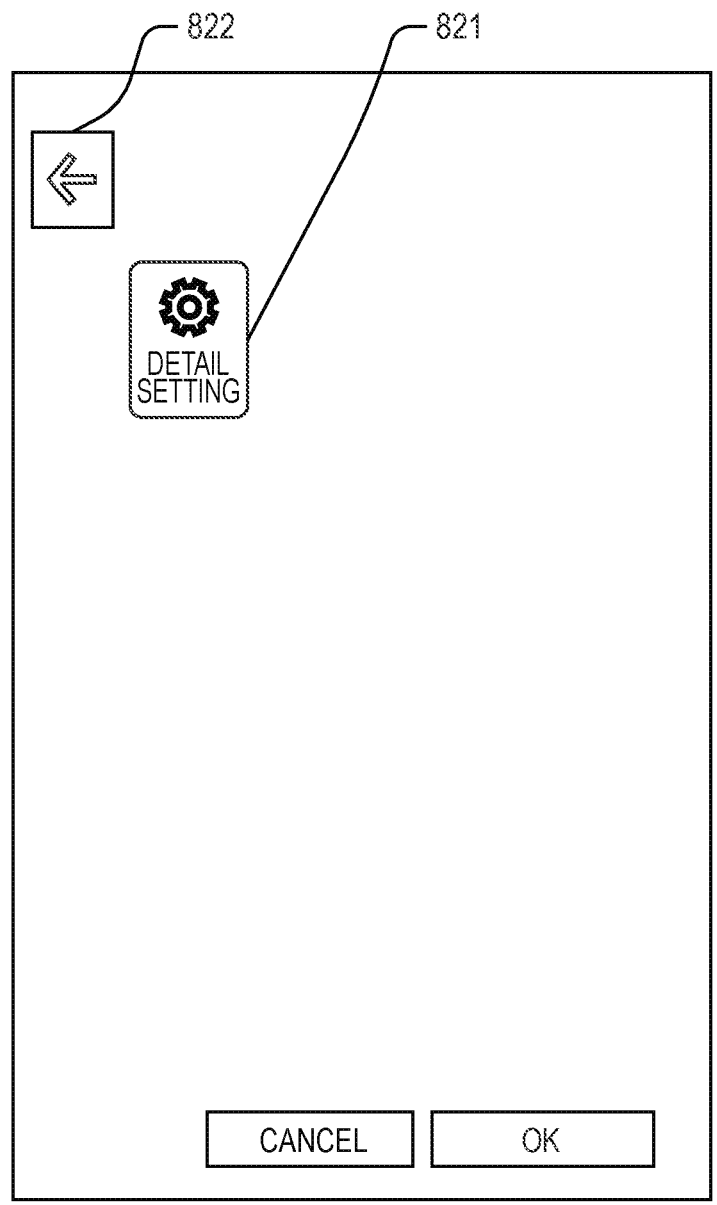
FIG. 8C is a diagram illustrating a detail print setting UI of a print extension application.

FIG. 8A to FIG. 8C are diagrams illustrating the detail print setting UI of the print extension application 3000.

The user performs an operation to select printing from a menu or the like of the touch application 3100. In response, the touch application 3100 issues a request to the OS 212 in accordance with the user operation and starts up the OS standard print UI (OS standard print window) generated by the OS 212 as illustrated in FIG. 8A (S701). Thereby, the OS standard print UI as illustrated in FIG. 8A is displayed on the display 207.

As illustrated in FIG. 8A, the OS standard print UI has a combo box 801 by which any print queue 3803 can be selected, a control list 804 by which a simple print setting of a standardized print function can be changed, and a detail setting link 805. Further, the OS standard print UI has a print button 802 and a cancel button 803. The OS 212 accepts a user operation from these elements 801 to 805 (S702). Note that, if the accepted user operation is an instruction of the detail setting link 805 (step S703, Yes), the OS 212 issues "detail setting event" (S704).

In response to issuing "detail setting event", the OS 212 checks whether or not the print extension application 3000 associated with the print queue 3803 selected in the combo box 801 has been installed in the OS 212. Then, if installed, the OS 212 starts up the detail print setting UI unit 3004 of the print extension application 3000. The detail print setting UI unit 3004 displays the detail print setting UI as illustrated in FIG. 8B.

FIG. 8B is a diagram illustrating an example of the detail print setting UI. In the detail print setting UI, a device specific function of the print queue 3803 or a UI used for more detailed print setting can be displayed.

When pressed, a finalize button 811 can cause the print setting set in the detail print setting UI (FIG. 8B) to be finalized. When the finalize button 811 is pressed, the detail print setting UI unit 3004 finalizes the print setting set in the detail print setting UI (FIG. 8B) and closes the detail print setting UI to return the control to the OS 212. The OS 212 returns the process to S702 and again accepts a user operation from the OS standard print UI (FIG. 8A).

When pressed, a cancel button 812 can cause the print setting set in the detail print setting UI (FIG. 8B) to be cancelled. When the cancel button 812 is pressed, the detail print setting UI unit 3004 cancels the print setting set in the detail print setting UI (FIG. 8B) and closes the detail print setting UI to return the control to the OS 212. The OS 212 returns the process to S702 and again accepts a user operation from the OS standard print UI (FIG. 8A).

Further, when an add-in button 813 is pressed, a process illustrated in FIG. 12A to FIG. 12C described later is performed, an add-in window as illustrated in FIG. 8C is displayed by the detail print setting UI unit 3004.

In the add-in window of FIG. 8C, a startup button of an add-in application that support the detail setting UI and supports the device type (for example, "MFP") of the printer 102 is displayed. In this example, a detail setting button 821 that is a startup button of the detail setting application is displayed. By pressing the detail setting button 821, it is possible to start up the detail setting application. Further, by pressing a back button 822, it is possible to turn the window back to the detail print setting UI (FIG. 8B).

When the user operation accepted in S702 described above is an operation of pressing the print button 802 of the OS standard print UI (FIG. 8A) (S703, No and S705, Yes), the OS 212 issues a print event and proceeds with the process to a print process of S706. At this time, the OS 212 closes the OS standard print UI. The print process of S706 will be described later in FIG. 7B. Upon completion of the print process of S706 described above, the OS 212 ends the process of the present flowchart.

Further, if the cancel button 803 is pressed in the OS standard print UI (S703, No and S705, No), the OS 212 ends the process of the present flowchart and closes the OS standard print UI.

Note that, although omitted in FIG. 7A, when a user operation other than pressing of the print button 802 and the cancel button 803 occurs on the OS standard print UI, the OS 212 performs a process in accordance with the user operation and returns the process to S702. The OS 212 then again accepts a user operation from the OS standard print UI (FIG. 8A).

The print process of S706 will be described below with reference to FIG. 7B.

FIG. 7B is a flowchart illustrating an example of the print process of S706 of FIG. 7A.

First, the spooler 3802 receives, from any application 210 that has performed printing, an XPS file that is data to be printed (S711).

Next, the OS 212 performs a printing startup process of the print extension application 3000 (S712). Note that the printing startup process will be described later with reference to FIG. 9A and FIG. 9B.

After the end of the printing application startup process of S712 described above, the filter pipeline manager 3805 acquires PrintTicket and an XPS file (S713).

Next, the filter pipeline manager 3805 loads the filter 3904 (S714).

Next, the filter pipeline manager 3805 uses the filter loaded in S714 described above to convert the XPS file acquired in S713 described above into PDL (S715). Next, the spooler 3802 transmits the PDL converted in S715 described above to the printer 102 (S716) and ends the print process.

Next, the printing startup process will be described with reference to FIG. 9A, FIG. 9B and FIG. 10A to FIG. 10C.

Figure 9A:
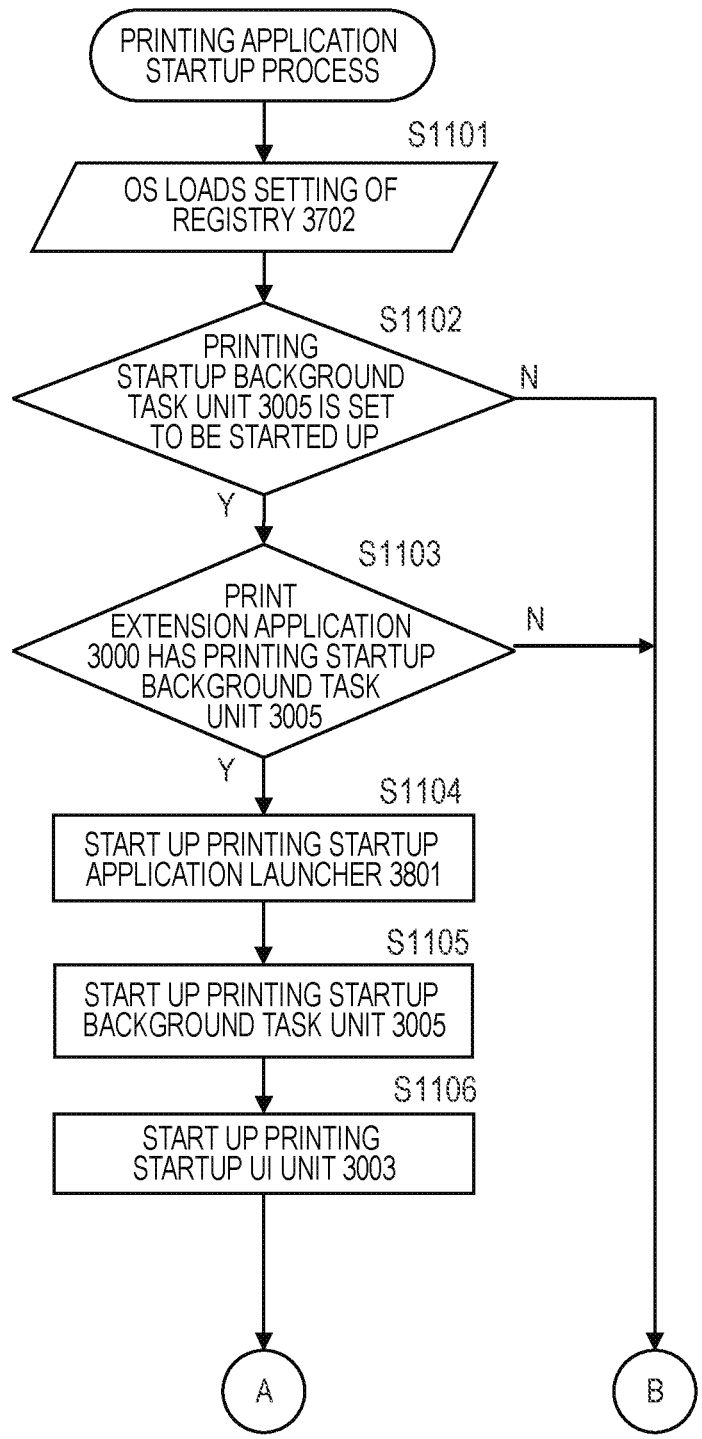
FIG. 9A is a flowchart illustrating an example of a printing startup process.
Figure 9B:
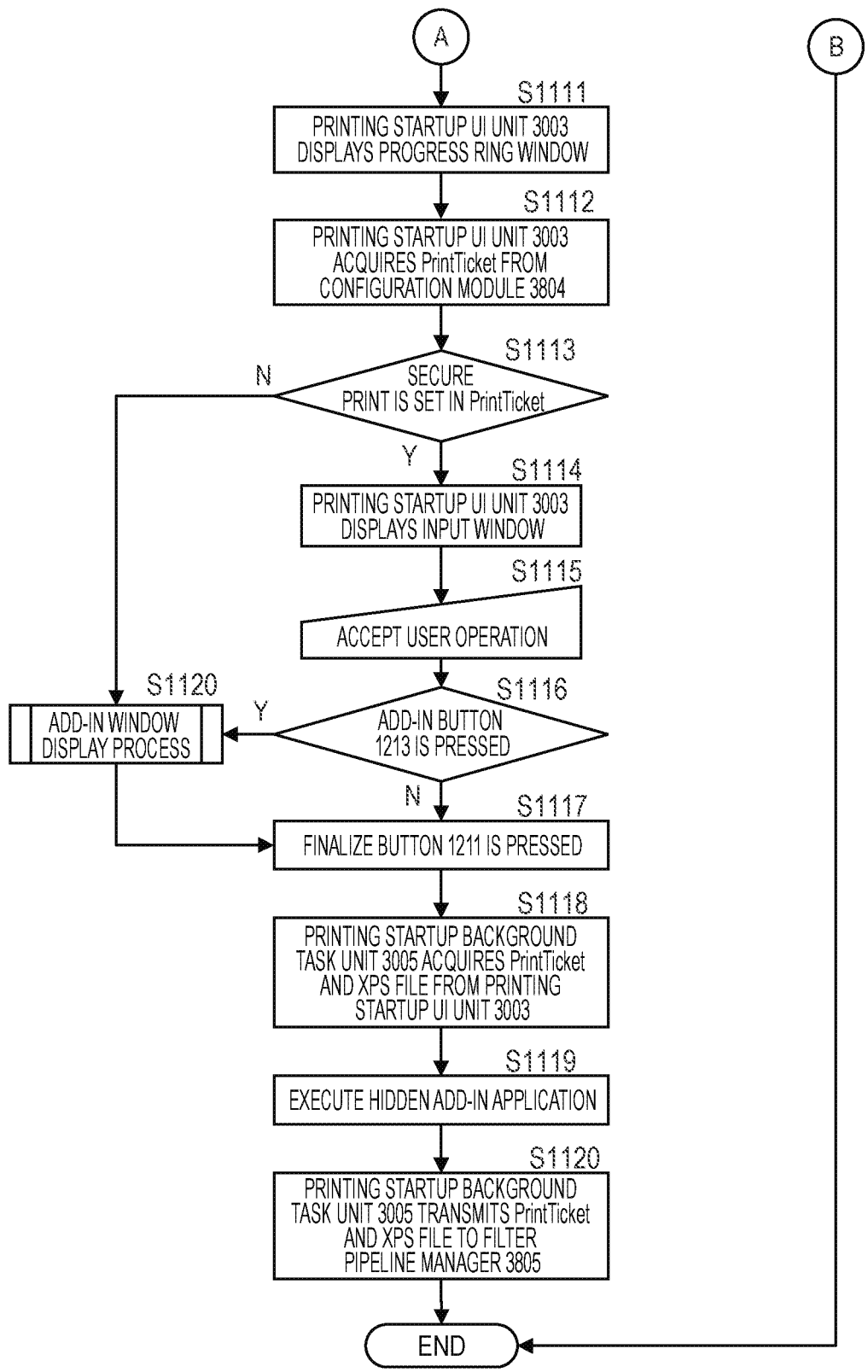
FIG. 9B is a flowchart illustrating an example of a printing startup process.

FIG. 9A and FIG. 9B are flowcharts illustrating an example of the printing startup process. Note that the processes of the flowcharts of FIG. 9A and FIG. 9B are realized by loading, to the RAM 202, and executing a program by which the CPU 201 implements each module, each component, or each application stored in the external memory 209.

Figure 10A:
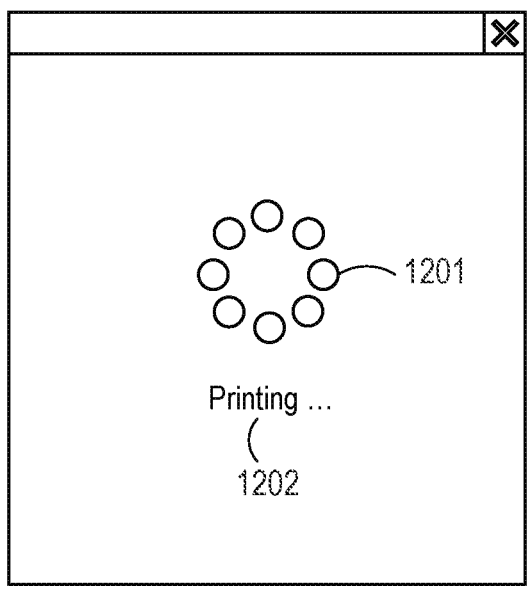
FIG. 10A is a diagram illustrating an example of a progress window of a printing startup UI of the print extension application.
Figure 10B:
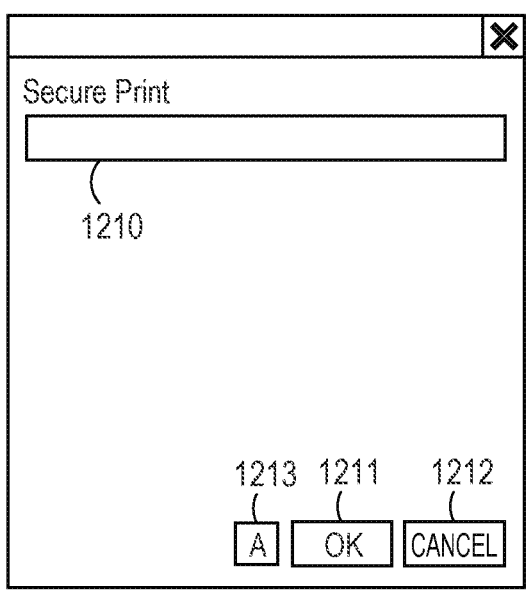
FIG. 10B is a diagram illustrating an example of a secure print entry window of the printing startup UI of the print extension application.
Figure 10C:
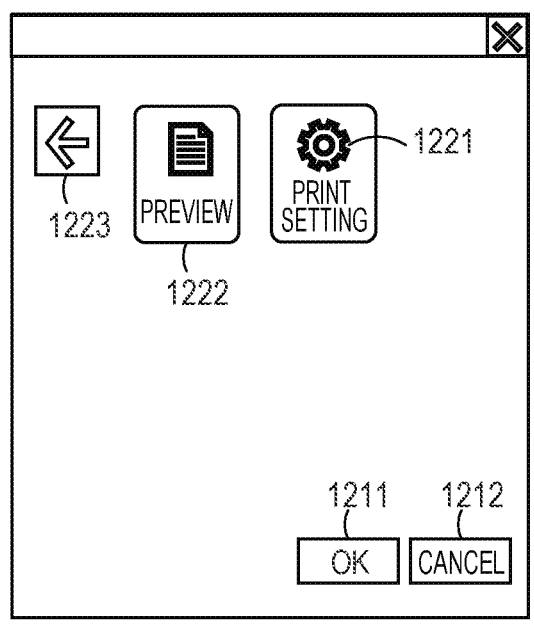
FIG. 10C is a diagram illustrating an example of an add-in window of the printing startup UI of the print extension application.

FIG. 10A to FIG. 10C are diagrams illustrating the printing startup UI of the print extension application 3000.

In the printing startup process, first, the OS 212 loads information on the registry 3702 (S1101).

Next, the OS 212 determines whether or not the printing startup background task unit 3005 is set to be started up in the registry 3702 (S1102). If the printing startup background task unit 3005 is set not to be started up in the registry 3702 (S1102, No), the OS 212 ends the process of the present flowchart.

On the other hand, if the printing startup background task unit 3005 is set to be started up in the registry 3702 (S1102, Yes), the OS 212 proceeds with the process to S1103.

In S1103, the OS 212 checks whether or not the print extension application 3000 has the printing startup background task unit 3005. If the print extension application 3000 does not have the printing startup background task unit 3005 (S1103, No), the OS 212 ends the process of the present flowchart.

On the other hand, if the print extension application 3000 has the printing startup background task unit 3005 (S1103, Yes), the OS 212 proceeds with the process to S1104.

In S1104, the OS 212 starts up the printing startup application launcher 3801 of the print extension application 3000.

Next, the printing startup application launcher 3801 starts up the printing startup background task unit 3005 (S1105).

The printing startup background task unit 3005 then calls the printing startup UI unit 3003 (S1106).

Next, the printing startup UI unit 3003 displays a progress ring on the UI as illustrated in FIG. 10A in order to indicate that the process is currently under progress (S1111).

FIG. 10A is a diagram illustrating an example of a progress window of the printing startup UI unit 3003 displaying a progress ring.

In a progress ring 1201, a displayed circle continues to be rotated to follow the circle during processing. A label 1202 is a label displaying the status of printing and indicates that it is under printing.

Next, the printing startup UI unit 3003 acquires PrintTicket from the configuration module 3804 (S1112).

Next, the printing startup UI unit 3003 checks whether or not secure print has been set in the PrintTicket (S1113). If no secure print has been set (S1113, No), the printing startup UI unit 3003 proceeds with the process to S1120.

In S1120, the printing startup UI unit 3003 performs an add-in window display process as illustrated in FIG. 12A to FIG. 12C and displays an add-in window as illustrated in FIG. 10C. Note that the add-in window display process and the add-in window will be described later. After the add-in window display process of S1120, the printing startup UI unit 3003 proceeds with the process to S1117.

Further, in S1113 described above, if secure print has been set in the PrintTicket (S1113, Yes), the printing startup UI unit 3003 proceeds with the process to S1114.

In S1114, the printing startup UI unit 3003 displays a secure print input window used for inputting a password number as illustrated in FIG. 10B.

FIG. 10B is a diagram illustrating an example of the secure print input window displayed by the printing startup UI unit 3003.

In FIG. 10B, a password number text box 1210 is for accepting entry of an arbitrary password number from the user.

An add-in button 1213 is a button used for transition to the add-in window as illustrated in FIG. 10C.

A finalize button 1211 is a button used for finalizing printing. Note that a change in the printing startup UI unit 3003 at a point of time the finalize button 1211 is pressed will be reflected to the PrintTicket or the XPS file of data to be printed, and printing will be performed.

A cancel button 1212 is a button used for cancelling printing.

In S1115, the printing startup UI unit 3003 accepts a user operation from the secure print input window (FIG. 10B). If the user operation accepted here is an operation of pressing the add-in button 1213 (S1116, Yes), the printing startup UI unit 3003 proceeds with the process to S1120, performs the add-in window display process, and displays the add-in window as illustrated in FIG. 10C. Note that description of the add-in window display process will be described later with reference to FIG. 12A to FIG. 12C.

The add-in window of FIG. 10C will now be described.

FIG. 10C is a diagram illustrating an example of an add-in window displayed by the printing startup UI unit 3003. In this add-in window, based on the add-in information illustrated in FIG. 11, add-in application startup buttons that support a printer (for example, the printer 102) that supports the printing startup UI and is linked to a print queue corresponding to the print process of FIG. 7B are displayed. In the example of the add-in window illustrated in FIG. 10C, a previewer add-in application startup button 1222 and a print setting add-in application startup button 1221 are displayed.

The previewer add-in application startup button 1222 is an add-in application startup button used for a previewer add-in application that is a type of add-in applications. By pressing the previewer add-in application startup button 1222, it is possible to start up a previewer add-in application.

The print setting add-in application startup button 1221 is an add-in application startup button used for a detail setting add-in application that is a type of add-in applications. By pressing the print setting add-in application startup button 1221, it is possible to start up a print setting add-in application.

A back button 1223 is a button used for returning to the secure print input window (FIG. 10B). Note that, when this add-in window is displayed from the beginning next to the progress ring window (FIG. 10A) without transition from the secure print input window (FIG. 10B) to this add-in window, there is no window to return, and therefore the back button 1223 is not displayed.

Further, the finalize button 1211 and the cancel button 1212 are displayed in the add-in window of FIG. 10C in the same manner as the secure print input window of FIG. 10B.

Further, if the user operation accepted in S1115 described above is not an operation of pressing the add-in button 1211 (S1116, No), the printing startup UI unit 3003 proceeds with the process to S1117.

In S1117, in response to the finalize button 1211 being pressed, the printing startup UI unit 3003 proceeds with the process to S1118. At this time, it is notified from the printing startup UI unit 3003 to the printing startup background task unit 3005 that the printing is finalized. Further, although not illustrated, if the user operation accepted in S1115 described above is an operation of input to the password number text box 1210, the printing startup UI unit 3003 returns the process to S1115 and again accepts a user operation. Further, when the cancel button 1212 is pressed, the printing startup UI unit 3003 ends the process of the present flowchart and cancels the printing.

In S1118, the printing startup background task unit 3005 acquires PrintTicket and an XPS file from the printing startup UI unit 3003.

Next, the printing startup background task unit 3005 executes an add-in application in which the Visibility 907 is set to be hidden in add-in information (S1119). That is, an add-in application whose Visibility 907 is set to be hidden ("false") is automatically started up regardless of the startup operation of the add-in application by the user. In response to completion of the execution of the add-in application of S1119, transfer information is returned from the add-in application to the print expansion application 3000. Note that the transfer information will be described later with reference to FIG. 14B.

Finally, the printing startup background task unit 3005 transmits the PrintTicket and the XPS file acquired in S1118 described above to the filter pipeline manager 3805 (S1119) and ends the process of the present flowchart.

The add-in window display process will be described below with reference to FIG. 12A to FIG. 12C.

FIG. 12A is a flowchart illustrating an example of the add-in window display process. Note that the processes illustrated in FIG. 12A, FIG. 12B, and FIG. 12C are realized by loading, to the RAM 202, and executing a program by which the CPU 201 implements each module, each component, or each application stored in the external memory 209.

The process illustrated in FIG. 12A is started when the add-in button 613 of FIG. 6B, the add-in button 621 of FIG. 6C, the add-in button 813 of FIG. 8B, or the add-in button 1213 of FIG. 10B is pressed.

First, the print extension application 3000 acquires, from the OS 212, a list of add-in applications that has already been installed inside the OS 212 (S1001).

Next, the print extension application 3000 checks the event of the OS that starts up the print extension application 3000 (that is, the OS 212 running on the client computer 101) (S1002). This event may be the standard UI startup event issued by pressing of the icon 610 of FIG. 6A, the detail setting event issued by the instruction of the detail setting link 805 of FIG. 8A, the print event issued by pressing of the print button 802, or the like.

Next, the print extension application 3000 performs an add-in information list generation process (S1003). The add-in information list generation process will now be described with reference to FIG. 12B.

FIG. 12B is a flowchart illustrating an example of the add-in information list generation process.

First, the print extension application 3000 loads add-in information from the add-in information description unit 3008 (S1051).

Next, the print extension application 3000 generates an add-in information list based on the add-in information loaded in S1051 described above (S1052).

Next, the print extension application 3000 checks whether or not an add-in application that has not yet been installed is present in the add-in information list (S1053). If an add-in application that has not yet been installed is present (S1053, Yes), the print extension application 3000 deletes the corresponding add-in application from the add-in information list (S1054) and ends the add-in list generation process.

On the other hand, if no add-in application that has not yet been installed is present in the add-in information list (S1053, No), the print extension application 3000 directly ends the add-in list generation process.

The description turns back to FIG. 12A below.

After the add-in information list generation process, the print extension application 3000 determines based on the check in S1002 described above whether or not the subject print extension application 3000 was started up with the standard UI startup event (S1004). If it was started up with the standard UI startup event (S1004, Yes), the process proceeds to S1005.

In S1005, the print extension application 3000 re-generates an add-in information list by using an add-in application supporting the standard UI startup event based on the add-in information list.

Next, the print extension application 3000 determines whether or not the present add-in window display process was started up from an add-in button of a device page (the button 621 in the example of FIG. 6C) (S1006). If the present add-in window display process was not started up from an add-in button of a device page (S1006, No), the print extension application 3000 proceeds with the process to S1016. That is, if the present add-in window display process was started up from the add-in menu button 613, the process proceeds to S1016.

In S1016, the print extension application 3000 excludes the model-dependent add-in application from the add-in information list, re-generates an add-in information list with only the model-independent add-in application, and proceeds with the process to S1007. Note that the model-dependent add-in application refers to the add-in application whose device type 906 is not "ALL" (for example, an add-in application whose device type 906 is "MFP"). On the other hand, the model-independent add-in application refers to an add-in application whose device type 906 is "ALL".

In such a case, in S1007, the print extension application 3000 displays an add-in window based on the add-in information list. That is, the print extension application 3000 adds a startup button of the add-in application included in the add-in information list to the add-in window and displays the addition. In such a case, the add-in window as illustrated in FIG. 6E is displayed.

On the other hand, if the present add-in window display process is started up from an add-in button of a device page (for example, the add-in button 621 of FIG. 6C) (S1006, Yes), the print extension application 3000 proceeds with the process to S1008.

In S1008, the print extension application 3000 moves on to a model-dependent add-in application check process of S1008. The model-dependent add-in application check process will now be described with reference to FIG. 12C.

FIG. 12C is a flowchart illustrating an example of the model-dependent add-in application check process.

In the model-dependent add-in check process, first, the print extension application 3000 checks whether or not a model-dependent add-in application is present in the add-in information list (S1071). If a model-dependent add-in application is present (S1071, Yes), the print extension application 3000 proceeds with the process to S1072.

In S1072, the print extension application 3000 acquires model information from the printer 102 by using the communication unit 3007.

Next, the print extension application 3000 excludes the add-in application which does not support the print queue 3803 corresponding to the displayed device page from the add-in information list. The print extension application 3000 then re-generates an add-in information list with only the add-in application which supports the print queue 3803 corresponding to the displayed device page (S1073). For example, when there is an add-in application whose device type 906 of add-in information is "MFP" and the displayed device page corresponds to the MFP printer, the add-in information on the add-in application is included in the add-in information list. Note that, although model information is acquired by the communication unit 3007 in the present embodiment, model information may be acquired from a device function text file 3902 of the printer driver 3900 or from another information other than the above.

After the process of S1073, the print extension application 3000 ends the model-dependent add-in application check process.

On the other hand, if no model-dependent add-in application is present in the add-in information list (S1071, No), the print extension application 3000 directly ends the model-dependent add-in application check process.

In response to the end of the model-dependent add-in application check process, the print extension application 3000 displays the add-in window based on the add-in information list in S1007 of FIG. 12A. That is, the print extension application 3000 adds the startup button of the add-in application included in the add-in information list to the add-in window and displays the addition. In such a case, the add-in window as illustrated in FIG. 6D is displayed. In displaying the add-in window, the print extension application 3000 displays an add-in application startup button used for starting up the add-in application (for example, 631, 632) in the add-in window based on the add-in information list. At this time, the print extension application 3000 excludes those having the Visibility 907 of the add-in information of "false" and displays the remaining. Furthermore, the print extension application 3000 loads an icon image to the memory from the icon file path 908 and displays the icon image as an add-in application startup button.

Then, if any of the add-in application startup buttons in the add-in window is pressed (S1014, Yes), the print extension application 3000 moves on to the add-in application startup process of S1015. At this time, the print extension application 3000 uses the name space 901 and the family name 902 of add-in information corresponding to the pressed add-in application startup button to uniquely identify an add-in application installed in the OS 212. Furthermore, the print extension application 3000 requests the OS 212 for startup of the add-in application together with transfer information as illustrated in FIG. 14B. The OS 212 starts up the requested add-in application in a process different from the print extension application 3000, passes the transfer information as illustrated in FIG. 14B to the add-in application, and moves on to the process of the add-in application startup process (S1015). The transfer information and the add-in application startup process will be described later.

On the other hand, if the add-in window is closed without the add-in application startup button being pressed (S1014, No), the print extension application 3000 ends the process of the present flowchart.

Further, in S1004 described above, if it is determined that the print extension application 3000 was not started up by the standard UI startup event (S1004, No), the process proceeds to S1009.

In S1009, the print extension application 3000 checks whether or not the subject print extension application 3000 was started up by a detail setting event. If the subject print extension application 3000 was started up by a detail setting event (S1009, Yes), the print extension application 3000 proceeds with the process to S1010.

In S1010, the print extension application 3000 re-generates an add-in information list of add-in applications supporting the detail setting based on the add-in information.

Next, the print extension application 3000 acquires the information on the print queue 3803 selected by the combo box 801 of FIG. 8A from the OS 212 (S1011) and moves on to the model-dependent add-in application check process of S1008. Note that the model-dependent add-in application check process is basically the same as that has already been described. In S1073, however, the add-in information list is re-generated with limited add-in applications which support the device type (printer type) of a printer corresponding to the print queue 3803 selected by the combo box 801. After the model-dependent add-in application check process, the print extension application 3000 displays an add-in window based on the add-in information list (S1007). That is, the print extension application 3000 adds a startup button of the add-in application included in the add-in information list to the add-in window and displays the addition. In such a case, the add-in window as illustrated in FIG. 8C is displayed.

Further, in S1009 described above, if the print extension application 3000 determines that the subject print extension application was not started up by a detail setting event (S1009, No), the process proceeds to S1012.

In S1012, the print extension application 3000 checks whether or not the subject print extension application 3000 was started up by a print event. If the subject print extension application 3000 was started up by a print event (S1012, Yes), the print extension application 3000 proceeds with the process to S1013.

In S1013, the print extension application 3000 re-generates an add-in information list of add-in applications supporting the print event based on the add-in information and moves on to the model-dependent add-in application check process of S1008. Note that the model-dependent add-in application check process is basically the same as that has already been described. In S1073, however, the add-in information list is re-generated with limited add-in applications which support the device type (printer type) of a printer corresponding to the print queue 3803 selected by the combo box 801. After the model-dependent add-in application check process, the print extension application 3000 displays an add-in window based on the add-in information list (S1007). That is, the print extension application 3000 adds a startup button of the add-in application included in the add-in information list to the add-in window and displays the addition. In such a case, the add-in window as illustrated in FIG. 10C is displayed.

On the other hand, in S1012 described above, if the print extension application 3000 determines that the subject print extension application 3000 was not started up by a print event (S1012, No), the process of the present flowchart ends.

The transfer information transferred between the print extension application 3000 and an add-in application will now be described with reference to FIG. 14B.

FIG. 14B is a diagram illustrating an example of transfer information transferred between the print extension application 3000 and an add-in application.

As illustrated in FIG. 14B, the transfer information is in the Key And Value form, and when a Key is selected, a Value is uniquely defined.

In the transfer information of the present embodiment, examples of Keys are written in the left column, and contents of information corresponding to Values are stored in the right column.

In FIG. 14B, four types of information are transferred between the print extension application 3000 and the add-in application as an example. In a job name 1501, a value acquired from the name of a job when printing is performed, namely, "job0001" is transferred here. In application name 1502 of the print source, "Web Browser" is transferred here. In data 1503 to be printed, "Dcocument.xps" in the XPS form is transferred here. In print setting information 1504, "pt.xmk" is transferred as PrintTicket.

Note that, although four types of information are provided as an example of transfer information in FIG. 14B, the type, the model, or the number of pieces of transfer information is not limited. Further, transfer is not necessarily required to be performed. Furthermore, transfer information can be transferred between different add-in applications via the print extension application 3000 as a hub.

The add-in application startup process will now be described with reference to FIG. 13.

Figure 13:
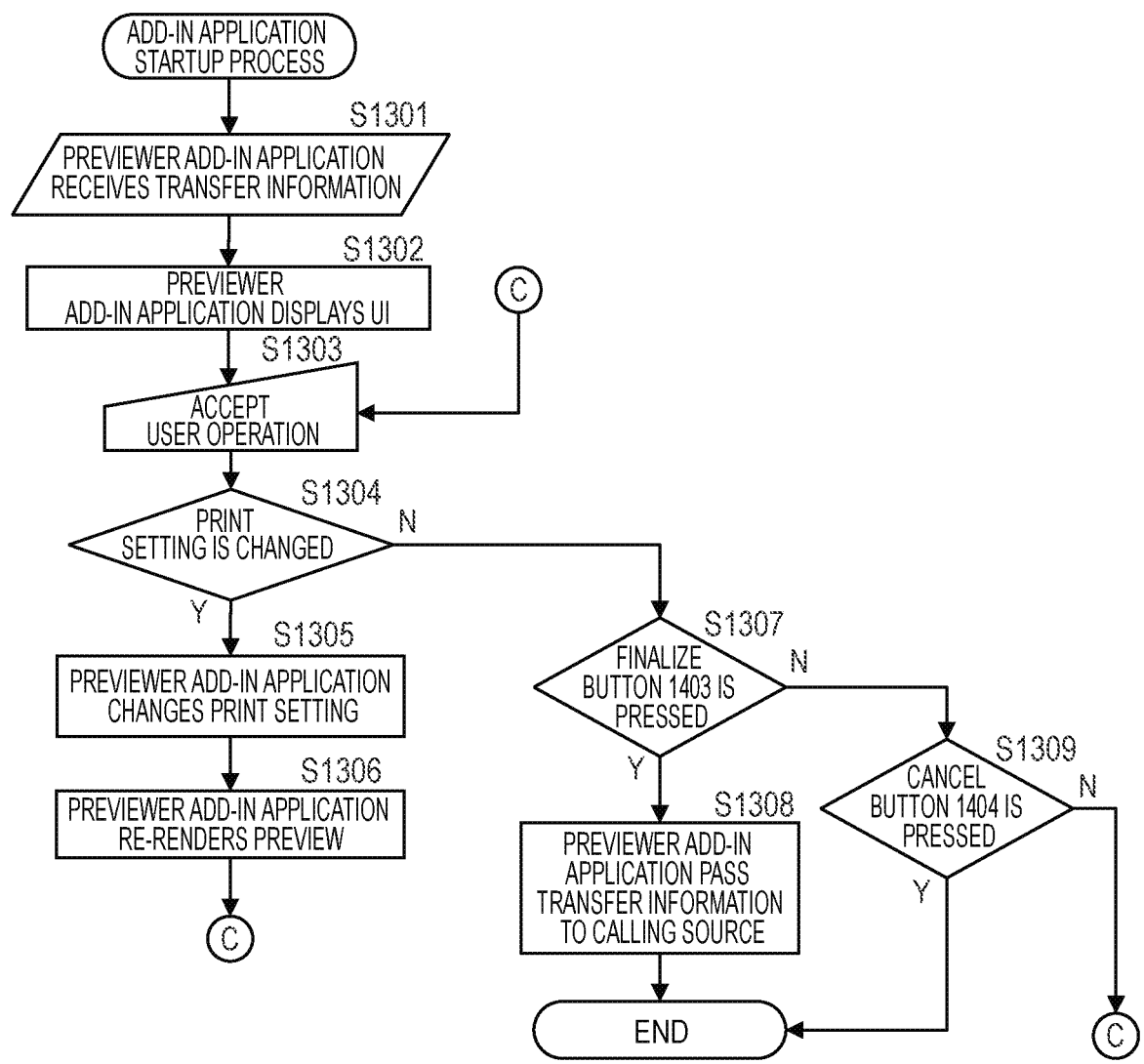
FIG. 13 is a flowchart illustrating an example of an add-in application startup process.

FIG. 13 is a flowchart illustrating an example of the add-in application startup process. The processes of the present flowcharts are realized by loading, to the RAM 202, and executing a program by which the CPU 201 implements each module, each component, or each application stored in the external memory 209.

In the example of FIG. 13, description is provided with an example of a previewer add-in application started up by the add-in button 1222 being pressed. However, this is an example, and the add-in application is not particularly limited thereto. The add-in application is started up as a process different from the print extension application 3000 by the OS 212 in accordance with a request from any of the standard UI unit 3002, the detail print setting UI unit 3004, and the printing startup UI unit 3003 of the print extension application 3000. However, the process thereof may be modal or not modal for the process of the print extension application 3000.

First, the previewer add-in application receives transfer information as illustrated in FIG. 14B from the print extension application 3000 that is a calling source (S1301).

Next, the previewer add-in application displays the UI as illustrated in FIG. 14A based on transfer information received in S1301 described above (S1302). Here, a UI of an add-in application will be described with reference to FIG. 14A.

FIG. 14A is a diagram illustrating an example of a UI of an add-in application. In particular, an example of a previewer add-in application is illustrated here.

As illustrated in FIG. 14A as an example, the previewer add-in application has a print preview 1402, a page number 1405 of a page displayed in the preview, a simple print setting 1401, a finalize button 1403, and a cancel button 1404.

In the print preview 1402, a preview of a final print content to be output from the printer 102 based on the data to be printed and the PrintTicket is displayed.

In the page number 1405, the total number of pages of previewed print information and a number of displayed page is indicated, and it is indicated in the example of FIG. 14A that the first page of data to be printed including 12 pages is displayed. Further, it is possible to change the page to be displayed in the print preview 1402 by pressing the arrows displayed in the left and the right of the page number 1405.

In the simple print setting 1401, a simple print setting is displayed based on the PrintTicket of transfer information. The user may change the print setting in the simple print setting 1401.

The description turns back to the flowchart of FIG. 13 below.

After displaying the UI in S1302 described above, the previewer add-in application accepts a user operation (S1303). If the print setting accepts a change via the simple print setting 1401 in accepting the user operation of S1302 described above (S1304, Yes), the previewer add-in application proceeds with the process to S1305.

In S1305, based on the change information on the accepted print setting described above, the previewer add-in application changes the PrintTicket of the print setting information and the XPS file of data to be printed. The previewer add-in application then re-renders the print preview 1402 (S1306) and returns the process to S1303.

In accepting the user operation of S1302 described above, if pressing of the finalize button 1403 is accepted instead of the change of the print setting (S1304, No and S1307, Yes), the previewer add-in application proceeds with the process to S1308.

In S1308, the previewer add-in application transfers the transfer information to the print extension application 3000 of the calling source again and ends the process of the present flowchart.

Further, in accepting the user operation of S1302 described above, if pressing of the cancel button 1404 is accepted (S1304, No, S1307, No, and S1309, Yes), the previewer add-in application ends the process of the present flowchart.

Further, if none of the change of the print setting, the pressing of the finalize button 1403, and the pressing of the cancel button 1404 is accepted (S1304, No, S1307, No, and S1309, No), the previewer add-in application returns the process to S1303.

While the previewer add-in application has been described above, the same applies to other add-in applications than the previewer add-in application.

As described above, according to the present embodiment, a startup button of an add-in application to add a function to the print extension application 3000 can be added to a UI of the print extension application 3000 that extends the function of a printer driver separated from the printer driver. In particular, a startup button of an add-in application can be displayed in only the UI supported by the add-in application. Thus, the UI of the print setting limited to the function used by the user can be provided.

Therefore, the function of the print extension application 3000 can be customized on a user basis, and good usability for a user can be achieved.

Further, it is possible for a vender to flexibly provide high functionality in accordance with a use case to the user by using an add-in application.

Note that the configuration of various data and the content thereof described above are not limited thereto and may be configured with various configurations or contents in accordance with a use or a purpose.

As set forth, although illustrated with respect to one embodiment, the present disclosure may take an implementation form as a system, an apparatus, a method, a program, a storage medium, or the like, for example. Specifically, the present disclosure may be applied to a system formed of a plurality of devices or may be applied to an apparatus formed of a single device.

Further, all the configurations in which respective embodiments described above are combined are included in the present disclosure.

Further, the present disclosure may be applied to a system formed of a plurality of devices or may be applied to an apparatus formed of a single device.

The present disclosure is not limited to the embodiments described above, and various modifications (including an organic combination of respective embodiments) are possible based on the spirit of the present disclosure and are not intended to be excluded from the scope of the present disclosure. That is, all the configurations in which each of the embodiments described above and the modified example thereof are combined are included in the present disclosure.

OTHER EMBODIMENTS

Embodiments of the present disclosure can also be realized by a computerized configurations of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computerized configurations of the system or apparatus by, for example, reading out and executing the computer executable instructions from the storage medium to perform the functions of one or more of the above-described embodiments and/or controlling the one or more circuits to perform the functions of one or more of the above-described embodiments. The computerized configurations may comprise one or more processors, one or more memories, circuitry, or a combination thereof (e.g., central processing unit (CPU), micro processing unit (MPU), or the like) and may include a network of separate computers or separate processors to read out and execute the computer executable instructions. The computer executable instructions may be provided to the computerized configurations, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-161544, filed Sep. 4, 2019, which is hereby incorporated by reference herein in its entirety.

What is claimed is:

1. An information processing apparatus comprising a storage that stores a print setting application that is associated with first and second print queues respectively corresponding to first and second printers and that is different from a printer driver, wherein the information processing apparatus, by executing the print setting application:
provides a first print setting interface that enables a user to perform print setting for printing by the first printer and a second print setting interface that enables a user to perform print setting for printing by the second printer;
determines that an installed add-in supports the first print queue corresponding to the first printer;
determines that the installed add-in does not support the second print queue corresponding to the second printer; and
adds a button of the add-in to another interface of the print setting application for the first print queue based on the determination that the add-in supports the first print queue corresponding to the first printer without adding a button of the add-in to another interface of the print setting application for the second printer.

2. A method for controlling an information processing apparatus by executing a print setting application that is associated with first and second print queues respectively corresponding to first and second printers and that is different from a printer driver, the method comprising:
providing a first print setting interface that enables a user to perform print setting for printing by the first printer and a second print setting interface that enables a user to perform print setting for printing by the second printer;
determining that an installed add-in supports the first print queue corresponding to the first printer;
determining that the installed add-in does not support the second print queue corresponding to the second printer; and
adding a button of the add-in to another interface of the print setting application for the first print queue based on the determining that the add-in supports the first print queue corresponding to the first printer without adding a button of the add-in to another interface of the print setting application for the second printer.

3. A non-transitory computer readable storage medium storing a print setting application, that is different from a printer driver, that causes a computer to perform when the print setting application is associated with first and second print queues respectively corresponding to first and second printers:
providing a first print setting interface that enables a user to perform print setting for printing by the first printer and a second print setting interface that enables a user to perform print setting for printing by the second printer;
determining that an installed add-in supports the first print queue corresponding to the first printer;
determining that the installed add-in does not support the second print queue corresponding to the second printer; and
adding a button of the add-in to another interface of the print setting application for the first print queue based on the determining that the add-in supports the first print queue corresponding to the first printer without adding a button of the add-in to another interface of the print setting application for the second printer.

4. The information processing apparatus according to claim 1, wherein the information processing apparatus, by executing the print setting application, further:
determines whether the installed add-in adds a button to a print setting interface or a setting interface; and
adds the button of the add-in to the setting interface in a case where the installed add-in is determined to add the button to the setting interface.

5. The information processing apparatus according to claim 1, wherein the installed add-in activates the print setting application so that information of the add-in is registered to the print setting application.

6. The information processing apparatus according to claim 5, wherein the information is registered to the print setting application so that the print setting application adds the button of the add-in to the setting interface.

7. The information processing apparatus according to claim 5, wherein:
a notification is displayed based on completion of the installing;
the add-in is activated based on selection of the notification by a user; and
the activated add-in activates the print setting application.

8. The method according to claim 2, further comprising:
determining whether the installed add-in adds a button to a print setting interface or a setting interface; and
adding the button of the add-in to the setting interface in a case where the installed add-in is determined to add the button to the setting interface.

9. The method according to claim 2, wherein the installed add-in activates the print setting application so that information of the add-in is registered to the print setting application.

10. The method according to claim 9, wherein the information is registered to the print setting application so that the print setting application adds the button of the add-in to the setting interface.

11. The method according to claim 9, wherein:
- a notification is displayed based on completion of the installing;
- the add-in is activated based on selection of the notification by a user; and
- the activated add-in activates the print setting application.

12. The non-transitory computer readable storage medium according to claim 3, wherein the instructions further cause the computer to perform:
- determining whether the installed add-in adds a button to a print setting interface or a setting interface; and
- adding the button of the add-in to the setting interface in a case where the installed add-in is determined to add the button to the setting interface.

13. The non-transitory computer readable storage medium according to claim 3, wherein the installed add-in activates the print setting application so that information of the add-in is registered to the print setting application.

14. The non-transitory computer readable storage medium according to claim 13, wherein the information is registered to the print setting application so that the print setting application adds the button of the add-in to the setting interface.

15. The non-transitory computer readable storage medium according to claim 13, wherein:
- a notification is displayed based on completion of the installing;
- the add-in is activated based on selection of the notification by a user; and
- the activated add-in activates the print setting application.

16. An information processing apparatus comprising a storage that stores a print setting application that is associated with first and second print queues respectively corresponding to first and second printers and that is different from a printer driver, wherein the information processing apparatus, by executing the print setting application:
- provides a first print setting interface that enables a user to perform print setting for printing by the first printer and a second print setting interface that enables a user to perform print setting for printing by the second printer; and
- adds a button of an add-in to a setting interface of the print setting application for the first print queue based on a determination that the add-in supports the first print queue corresponding to the first printer without adding a button of the add-in to a setting interface of the print setting application for the second printer.

17. The information processing apparatus according to claim 16, wherein the information processing apparatus, by executing the print setting application, further:
- determines whether the add-in adds a button to a print setting interface or a setting interface; and
- adds the button of the add-in to the setting interface in a case where the add-in is determined to add the button to the setting interface.

18. The information processing apparatus according to claim 16, wherein the add-in activates the print setting application so that information of the add-in is registered to the print setting application.

19. The information processing apparatus according to claim 18, wherein the information is registered to the print setting application so that the print setting application adds the button of the add-in to the setting interface.

20. The information processing apparatus according to claim 18, wherein:
- a notification is displayed based on completion of installing the add-in;
- the add-in is activated based on selection of the notification by a user; and
- the activated add-in activates the print setting application.

* * * * *